United States Patent [19]

Ikuhara et al.

[11] Patent Number: 5,631,124
[45] Date of Patent: May 20, 1997

[54] METHOD OF PRODUCING A PHOTOGRAPHIC POLYESTER LAMINATE SUPPORT

[75] Inventors: Isao Ikuhara; Fumio Kawamoto; Yoshiki Sakaino; Shohei Yoshida; Yasutomo Goto, all of Minami-ashigara, Japan

[73] Assignee: Fuji Photo Film Co., Ltd., Kanagawa, Japan

[21] Appl. No.: 379,935

[22] Filed: Jan. 27, 1995

[30] Foreign Application Priority Data

Jan. 28, 1994 [JP] Japan ................. 6-008802

[51] Int. Cl.$^6$ ................. G03C 1/795; B32B 3/10
[52] U.S. Cl. ................. 430/533; 430/523; 430/939; 428/46; 428/212; 428/215; 428/220
[58] Field of Search ................. 430/533, 501, 430/523, 939; 428/212, 215, 220, 46

[56] References Cited

U.S. PATENT DOCUMENTS

| | | | |
|---|---|---|---|
| 4,141,735 | 2/1979 | Schrader et al. | 430/141 |
| 4,198,458 | 4/1980 | Mitsuishi et al. | 428/212 |
| 5,180,658 | 1/1993 | Kiyohara et al. | 430/533 |
| 5,306,606 | 4/1994 | Tachibana et al. | 430/533 |
| 5,372,925 | 12/1994 | Kobayashi et al. | 430/533 |

FOREIGN PATENT DOCUMENTS

A1-131550  5/1989  Japan.

OTHER PUBLICATIONS

Encyclopedia of Polymer Science and Engineering, vol. 12, pp. 193–214, John Wiley & Sons, 1988.

*Primary Examiner*—Hoa Van Le
*Attorney, Agent, or Firm*—Sughrue, Mion, Zinn, Macpeak & Seas

[57] ABSTRACT

A method of producing a photographic polyester laminate support having a laminate of layers of at least two kinds of polyesters can provide low formation of scratches in a camera and a curl in the film's width direction. In the support, the glass transition temperature (Tg) of each polyester of the laminate is within the range of from 90° C. to 200° C. and the laminate is subjected to heat-fixing in a temperature range as defined by formula (1):

$$\text{Heat-fixing temperature (°C.)} = (Tm(L) - 50) \text{ to } (Tm(H) - 10) \quad \text{formula (1)}$$

wherein Tm(H)(°C.) means the highest melting temperature of polyesters that constitute the laminate support, and Tm(L) (°C.) means the lowest melting temperature of polyesters that constitute the laminate support.

17 Claims, No Drawings

METHOD OF PRODUCING A PHOTOGRAPHIC POLYESTER LAMINATE SUPPORT

FIELD OF THE INVENTION

The present invention relates to a photographic polyester laminated support and a method of producing the same, and particularly to a method of producing a photographic polyester laminate support that provides low formation of scratches in a camera, that provides a reverse curl to strike off a curl in the film's width direction, and that excels in both mechanical strength and adhesiveness between layers.

BACKGROUND OF THE INVENTION

Triacetylcellulose (hereinafter abbreviated as TAC) has been conventionally used as a support of roll-like silver halide photosensitive materials. This is because a core set curl formed in a cartridge (a magazine) can be striken off during a development processing. The core set curl (curl in the film's long direction) means a phenomenon that, after a flat film is wound in its longer direction on a roll and is removed from the roll, the film is still apt to become a vortex in form.

Recently, cartridge miniaturization has been desired. However, it has been difficult to make a TAC support thinner than 115 µm, because of its weak mechanical strength.

On the other hand, a polyester support that is formed from polyethyleneterephthalate (hereinafter abbreviated as PET) excels in mechanical strength and is suitable for making a thin support. But it has the drawback that the core set curl cannot be recovered. With regard to a method of removing this drawback from the polyester support, U.S. Pat. No. 4,141,735 describes a method of preventing the core set curl, which method comprises subjecting a polyester-series polymer to heat processing at its glass transition temperature (hereinafter referred to as Tg) or a temperature lower than the Tg (hereinafter referred to as "below Tg annealing," abbreviated as BTA).

A silver halide photographic light-sensitive material generally has a support on which are coated light-sensitive layers that contain a light-sensitive silver halide dispersed in gelatin. These layers shrink at a low humidity condition and cause a curl in the film's width direction. Such a curl in the width direction causes scratches due to friction of a film pressure plate with the back surface of the film during handling of the film in a camera, which results in fatal damage to the film. The curl in the film's width direction (transverse curl) is a phenomenon that a flat film, coated with photosensitive layers on one surface of the film and a back layer on another surface thereof, warps in its width direction, making the photosensitive-layer-coated side become the inner side, to form a round curved surface like a gutter.

There have been known several methods for imparting a reverse curl in advance (a curl formed in a reverse direction in order to make the emulsions-coated-side of the support become convex; it is referred to as reverse curl in this specification) to a polyester base, to strike off such a reverse curl in the width direction. This "curl" has the effect of reducing the transverse curl. For example, JP-A ("JP-A" means a published unexamined Japanese Patent Application) No. 131550/1989 discloses a method wherein the reverse curl is imparted by making a difference in temperature between the surface side and the back side of the film support during its stretching film-forming. This method is suitable for a thick support of 150 µm or more, because it is easy to make a difference in temperature between the surface side and the back side of the support.

However, it has been difficult to apply such a method to a thin support of 100 µm or less, as used in the present invention, since it is difficult to make a difference in temperature between the surface side and the back side of itself. Further, other methods, wherein different layers are laminated, are also known, as described in JP-A No. 123420/1975 and U.S. Pat. No. 4,198,458. However, these methods have a drawback in that the mechanical strength is apt to be lowered.

SUMMARY OF THE INVENTION

Accordingly, an object of the present invention is to provide a method of producing a polyester support that is previously given a reverse curl sufficient for striking off a curl in the film's width direction and that has excellent mechanical characteristics in adhesiveness between layers.

Other and further objects, features, and advantages of the invention will appear more fully from the following description.

DETAILED DESCRIPTION OF THE INVENTION

The above-mentioned object has been attained by a method of producing a photographic polyester laminate support having a laminate of layers of at least two kinds of polyesters, in which support the glass transition temperature (Tg) of each polyester that constitutes each layer is within the range of from 90° C. to 200° C., wherein the method comprises heat-fixing the laminate of layers of polyesters in a temperature range as defined by formula (1), preferably formula (21, and more preferably formula (3):

formula (1)

Heat-fixing temperature (°C.) = (Tm(L)-50) to (Tm(H)-10 formula (2)

Heat-fixing temperature (°C.) = (Tm(L)-35) to (Tm(H)-15 formula (3)

Heat-fixing temperature (°C.) = (Tm(L)-30) to (Tm(H)-20 wherein Tm(H)(°C.) means the highest melting temperature of polyesters that constitute the laminate support, and Tm(L)(°C.) means the lowest melting temperature of polyesters that constitute the laminate support.

The heat-fixating is a process for generating crystals in a film, and it greatly influences the mechanical strength, e.g., scratch strength, Young's modulus, tearing strength, and stiffness. That is, when a layer whose Tm is lower than the heat-fixing temperature (Tf) exists, crystals are melted and therefore cannot be formed in such a layer. As a result, a layer having an inferior mechanical strength is manufactured. On the other hand, when a layer whose Tf is much lower than Tm exists, formation of crystals is also insufficient in such a layer, which results in manufacturing a layer that has weak mechanical strength.

According to the present invention, a photographic support having a sufficient mechanical strength and a reverse curl was able to be produced by heat-fixing in the range defined by formulae (1), (2) and (3).

Films having these characteristic laminate (laminate compositions) can be formed by conventional methods, such as a co-extrusion method, an in-line laminate method, and an off-line laminate method.

The co-extrusion method comprises the following steps: extruding a melt of each layer in a sheet from a slit-shaped die; conducting the extruded melts to a die; laminating these melts using a multi-manifold or feed block, in accordance with the number of layers; extruding the laminate from a mouthpiece; cooling and solidifying the same on a casting roll, to form an unstreched film; and then subjecting the film to biaxial stretching and heat-fixing.

In the in-line laminate method, each layer is laminated before completion of the biaxial stretching, i.e., at the time of unstretching or after monoaxial stretching. Then the biaxial stretching and heat-fixing are completed. The in-line lamination method used may be dry lamination, hot-melt lamination, extrusion lamination, and the like.

In the off-line lamination method, lamination is carried out after completion of the biaxial stretching, and the above-described lamination methods are used.

This lamination melt extrusion and this biaxial stretching film-forming method are preformed as described below. Pellets of polyesters (raw materials) for each layer are dried and then supplied to an ordinary extruder, followed by melting them at the range of from the Tm of each polyester to Tm+80° C. Melt polyesters are extruded onto a casting dram while being laminated according to the above-described methods, to form an unstretched film. At this time, an electrostatic impression method can be used.

A film is produced by subjecting the unstretched film to biaxial stretching. A stretching temperature can be chosen within the range of from the highest Tg (hereinafter referred to as Tg/H) of each layer to Tg/H+70° C. The magnification of each stretching to be carried out is preferably to be within the range of from 2.5 to 4. The biaxial stretching may be a simultaneous biaxial stretching or a successive biaxial stretching. After the biaxial stretching, stretching can be further carried out once or more in the length direction, the width direction, or both.

In order to more smoothly perform the biaxial stretching, it is preferable to chose materials of each layer so that the difference between the highest temperature and the lowest temperature of the Tg of each layer becomes 50° C. or lower, more preferably 40° C. or lower, and further preferably 30° C. or lower.

The stretched film is subjected to heat-fixing. Thereby crystals are formed in the film, and as a result the film becomes strong. As described above, this process is the key point of the present invention.

The temperature in the heat-fixing zone is set to be within the temperature range defined by the above described formulae (1) to (3). Such fixing of temperature for heat-fixing can be carried out by an application of hot air or an infrared ray heater placed in the zone. The temperature control is preferably performed so as to become within 20° C. of the difference between the highest and the lowest temperatures in the zone; thereby a mechanically stable film can be obtained.

The heat-fixing time to be applied is within the range of preferably from 5 to 180 seconds, more preferably from 10 to 120 seconds, and further preferably from 15 to 60 seconds.

Such a heat-fixing can be carried out at the definite width of film or while making it looser.

After that, the film is cooled to the temperature of Tg or lower, and then it is rolled.

In order to make the effect of the present invention more outstanding, it is preferable to laminate materials that each have a difference between Tm(H) and Tm(L) that is within the range of from 0° C. to 30° C., more preferably from 2° C. to 20° C., and further preferably from 4° C. to 10° C.

With respect to the crystallinity of layers of the surface side and the back side of the thus obtained laminate composition, preferably the crystallinity $\chi$CA of the outermost layer and the crystallinity $\chi$CB of the second-outermost layer satisfy the relation of formula (4), more preferably of formula (5), and further preferably of formula (6).

| | |
|---|---|
| $0.05 \leq (\chi CA - \chi CB)/\chi CA \leq 0.9$ | formula (4) |
| $0.10 \leq (\chi CA - \chi CB)/\chi CA \leq 0.8$ | formula (5) |
| $0.15 \leq (\chi CA - \chi CB)/\chi CA \leq 0.7$ | formula (6) |

When the value of $(\chi CA - \chi CB)/\chi CA$ is too small, the difference in the crystallinity between the surface layers and the back layers is too small to provide a sufficient reverse curl. On the other hand, when said the value is too large, it means that crystals are hardly formed in one of the two layers, which results in an unfavorable situation, i.e., reduction of mechanical strength.

A combination of materials in each constituent layer of these laminate compositions may be the same polymers, except for having layer-respective different intrinsic viscosities, or alternatively they may be polymers of different materials, e.g., different homopolymers, different copolymers in terms of a component and a composition ratio, and a blend of polymers. Of these laminate compositions, a laminate composed of polymers of different materials is preferred, because a reverse curl can be easily provided. Further, greater reverse curl can be attained by laminating these layers of different materials separate from each other as much as possible in the direction of thickness. For this reason, most preferably each of these layers is placed as an outermost layer. The polymers of different materials according to the present invention means copolymers or a blend of polymers, whose difference in their composition ratio is 2 weight % or greater. In order to obtain a more outstanding reverse curl, it is preferable to use polymers whose difference in their composition ratio is not less than 2 weight %, more preferably not less than 4 weight %, and further preferably not less than 7 weight %. However, when materials of layers adjacent to each other are too largely different, adhesiveness between laminate films is apt to be reduced. For this reason, materials of the adjacent layers are preferably copolymers whose (co)monomers are same but their composition ratio is different, or a blend of polymers whose main component polymer is common but whose subcomponent polymer materials are different. For the polymers (homo- or co-polymer, the ratio of the common monomer component is preferably not less than 50 mol %, more preferably not less than 70 mol %, and further preferably not less than 80 mol %. For the blend of polymers, the ratio of the common polymer component is preferably not less than 50 wt %, more preferably not less than 70 wt %, and further preferably not less than 80 wt %.

A laminate construction may be composed of two or more layers, preferably from 5 to 2 layers, more preferably 3 or 2 layers, and further preferably 2 layers. Since a reverse curl can be attained by at least two layers according to the present invention, fewer numbers of layers are preferable in terms of reduced cost of film production.

A preferable thickness of each layer is within the range of 10 to 90 μm, more preferably 20 to 80 μm, and further preferably 30 to 70 μm. A sufficient reverse curl cannot be attained by layers thinner than the above-described range.

Further, for the two-layered film, the ratio of the layers' thickness is within the range of preferably 1:5 to 5:1, and more preferably 1:3 to 3:1. When the difference between their thickness becomes too large, strain due to the difference between their heat contraction becomes larger, so that curl control becomes impossible.

Further, the total film-thickness of the support is within the range of preferably 60 to 100 µm, more preferably 70 to 95 µm, and further preferably 80 to 95 µm. When the support is thinner than the above-described range, its mechanical strength is insufficient, and during treatment the support breaks easily and generation of knicks is caused. On the other hand, when the support is thicker than the above-described range, one of the objects of the present invention, which is to make a support thinner, cannot be attained.

As polyesters constituting laminate compositions according to the present invention, the following polymers are examples that may be used: homopolymers, such as polyethylene terephthalate, polyethylene-2,6-naphthalate (PEN), and polycyclohexane dimethanolterephthalate (PCT); and copolymers obtained by copolymerizing at least one of dicarboxylic acids selected from 2,6-naphthalene dicarboxylic acid (NDCA), terephthalic acid (TPA), isophthalic acid (IPA), ortho phthalic acid (OPA), cyclohexanedicarboxylic acid (CHDC), and paraphenylenedicarboxylic acid (PPDC), and at least one of diols selected from ethyleneglycol (EG), cyclohexanedimethanot (CHDM), neopentylglycol (NPG), bisphenol A (BPA), and bisphenol (BP), or by copolymerizing the dicarboxylic acid or the diol and a hydroxycarboxylic acid, such as parahydroxy benzbic acid (PHBA) and 6-hydroxy-2-naphthalene carboxylic acid (HNCA), as a copolymerizing component.

Of these polyesters, the most preferable polyesters are those containing a naphthalene dicarboxylic acid (2,6-naphthalene dicarboxylic acid, 1,5-naphthalene dicarboxylic acid, 1,4-naphthalene dicarboxylic acid, or 2,7-naphthalene dicarboxylic acid) in a proportion of not less than 30 mol %, preferably not less than 50 mol %, and more preferably not less than 70 mol %, of the total dicarboxylic acid. A blend of polymers is also preferred.

However, it is not preferred to use water-absorbent polyesters having a hydrophilic group. Water absorbent polyesters mean those that indicate 1.0 weight % or more of saturated water-absorbing amount when immersed in water at 25° C. They are exemplified by polyesters containing 1 weight % or more of polyalkyleneglycol (molecular weight: not less than 200), or polyesters containing a dicarboxylic acid monomer having metal salt of a sulfonic group, which is represented by sodium sulfo isophthalate, in an amount of 1 mol % or more based on total acidic component. These water-absorbent polymers reduce their mechanical strength owing to water absorption during a development process, and as a result jamming and scratches in a processor are apt to occur. This is why such water-absorbent polymers are not preferred in the present invention.

Accordingly, it is more preferable for the polymer to contain substantially no metal salt of a sulfonic group and/or polyoxyethylene groups.

These copolymers and homopolymers can be synthesized by previously known methods of producing polyesters. For example, polyesters can be synthesized by subjecting an acidic component and a glycol component directly to esterification, or, when a dialkylester is used as an acidic component, by subjecting the dialkylester and a glycol component to transesterification, and then removing an excess glycol component while heating under reduced pressure. Polyesters can also be prepared by reacting an acid halide, as an acidic component, with glycol. During these reactions, optional use can be made of transesterification catalysis or polymerization reaction catalysis, or a heat stabilizer may be added. These preparations of polyesters can be performed with reference to, for example, "Condensation polymerization and Addition polymerization," High Molecular Experimental Study No. 5, pp 103–136, published by Kyoritsu Shuppan (1980), and "Synthetic High Molecule V." pp 187–286, published by Asakura Shoten (1971).

The preferable weight-average molecular weight of these polyesters is within the range of 5,000 to 100,000.

A blend of the thus obtained polymers can be easily prepared according to the methods described in JP-A Nos. 5482/1974, 4325/1989, and 192718/1991; Research Disclosure No. 283, pp 739–741; ibid No. 284, pp 779–782; and ibid No. 294, pp 807–814.

Preferable specific examples of polyesters that can be used in the present invention are mentioned below, which, however, are not intended to restrict the scope of the present invention.

EXAMPLES OF POLYESTER COMPOUNDS

1. Homopolymers (the figures in parenthesis indicate a molar ratio)

| | | |
|---|---|---|
| 1-1 | PEN: | [2,6-Naphthalene dicarboxylic acid (NDCA)/ Ethylene glycol (EG) (100/100)] $Tg = 119°$ C.  $Tm = 268°$ C. |
| 1-2 | PCT: | [Terephthalic acid (TPA)/ Cyclohexanedimethanol (CHDM) (100/100)] $Tg = 93°$ C.  $Tm = 293°$ C. |

2. Copolymers (the figures in parenthesis indicate a molar ratio)

| | | | |
|---|---|---|---|
| 2-1 | 2,6-NDCA/TPA/EG (35/65/100) | $Tg = 91°$ C. | $Tm = 254°$ C. |
| 2-2 | 2,6-NDCA/TPA/EG (80/20/100) | $Tg = 111°$ C. | $Tm = 264°$ C. |
| 2-3 | 2,6-NDCA/TPA/EG (95/5/100) | $Tg = 117°$ C. | $Tm = 242°$ C. |
| 2-4 | 2,6-NDCA/EG/BPA (100/65/35) | $Tg = 130°$ C. | $Tm = 242°$ C. |
| 2-5 | 2,6-NDCA/EG/BPA (100/80/20) | $Tg = 125°$ C. | $Tm = 250°$ C. |
| 2-6 | 2,6-NDCA/EG/BPA (100/95/5) | $Tg = 121°$ C. | $Tm = 260°$ C. |
| 2-7 | 2,6-NDCA/TPA/EG/BPA (75/25/75/25) | $Tg = 122°$ C. | $Tm = 249°$ C. |
| 2-8 | 2,6-NDCA/TPA/EG/BPA (50/50/75/25) | $Tg = 112°$ C. | $Tm = 240°$ C. |
| 2-9 | 2,6-NDCA/NPG/EG (100/70/30) | $Tg = 105°$ C. | $Tm = 239°$ C. |
| 2-10 | 2,6-NDCA/NPG/EG (100/50/50) | $Tg = 110°$ C. | $Tm = 251°$ C. |
| 2-11 | 2,6-NDCA/NPG/EG (100/10/90) | $Tg = 116°$ C. | $Tm = 258°$ C. |

3. A Blend of Polymers
(the figures in parenthesis indicate a molar ratio)

| 3-1  | PEN/PET (35/65) | Tg = 93° C.  | Tm = 253° C. |
|------|-----------------|--------------|--------------|
| 3-2  | PEN/PET (50/50) | Tg = 96° C.  | Tm = 255° C. |
| 3-3  | PEN/PET (95/5)  | Tg = 116° C. | Tm = 265° C. |
| 3-4  | PEN/PAr (55/45) | Tg = 153° C. | Tm = 244° C. |
| 3-5  | PEN/PAr (70/30) | Tg = 141° C. | Tm = 248° C. |
| 3-6  | PEN/PAr (95/5)  | Tg = 121° C. | Tm = 259° C. |
| 3-7  | PEN/PCT (50/50) | Tg = 107° C. | Tm = 239° C. |
| 3-8  | PEN/PCT (70/30) | Tg = 112° C. | Tm = 255° C. |
| 3-9  | PEN/PCT (95/5)  | Tg = 118° C. | Tm = 262° C. |
| 3-10 | PEN/PCT (80/20) | Tg = 109° C. | Tm = 258° C. |

To the thus obtained polymers and a blend of polymers, there can be added, during or after the polymerization, a ultraviolet absorbent, for providing storage stability; inert inorganic grains and dyes, for preventing light piping; and an inert inorganic compound, for providing smoothness.

The ultraviolet absorbent preferably has no absorption in the visible range, and its addition amount is generally from about 0.5 weight % to about 20 weight %, and preferably from about 1 weight % to about 10 weight %, based on the weight of the polymer film. The ultraviolet absorbent cannot sufficiently prevent deterioration due to ultraviolet rays if the amount is too small. Example ultraviolet absorbents, that may be used are benzophenones, such as 2,4-dihydroxybenzophenone, 2-hydroxy-4-methoxybenzophenone, 2-hydroxy-4-n-octoxybenzophenone, 4-dodecyloxy-2-hydroxybenzophenone, 2,2',4,4'-tetrahydroxybenzophenone and 2,2'-dihydroxy-4,4'-dimethoxybenzophenone; benzotriazoles, such as 2(2'-hydroxy-5-methylphenyl) benzotriazole, 2(2'-hydroxy-3',5'-di-t-butylphenyl) benzotriazole and 2(2'-hydroxy-3'-di-t-butyl-5'-methylphenyl)benzotriazole; and salicylic acids, such as phenyl salicylate and methyl salicylate.

A refractive index of the polyester, particularly aromatic-series polyesters, is as high as 1.6 to 1.7. On the other hand, a refractive index of gelatin, which is a main component of a photosensitive layer coated on the polyester, is from 1.50 to 1.55, which is lower than the above value of 1.6 to 1.7. Therefore, a ray of light incident upon a film edge reflects at the interface between a base and an emulsion layer, and causes so-called light-piping phenomenon (edge-fogging).

Several methods for preventing such light-piping phenomenon are known. For example, inert inorganic grains or dyes are added to the film for the above-described purpose. Of these methods, the addition of dyes is preferred, since this method little increases film haze.

With respect to dyes for use in film dyeing, a color tone is preferably gray-dyeing in terms of general properties of the photosensitive material. Preferably the dye excels in heat resistance at the temperature zone for film production of the polyester, and it also excels in affinity to the polyester.

The expected results for the dye can be achieved by mixing commercially marketed dyes for polyesters, such as Diaresin, manufactured by Mitsubishi Kasei Corp., and Kayaset, manufactured by Nippon Kayaku Corp., from the above point of view.

The polyester film that is used in the present invention can be given smoothness according to its use, and a general method such as kneading of inert inorganic materials together with the polyester, or coating of surfactants on the polyester, are used for this purpose.

Examples of such inert inorganic grains are $SiO_2$, $TiO_2$, $BaSO_4$, $CaCo_3$, talc, and Kaolin. Further, a method of giving smoothness to the polyester, which comprises depositing catalyst or something like that, which is added at the time of polymerization reaction of the polyester, i.e., a method in which an internal grain system is used, can be used as well as the above described method in which inert external grains are added to a reactor for preparing the polyester.

As to the external grain system, it is preferred to chose $SiO_2$, which has a refractive index relatively close that of the polyester film. Alternatively, it is also preferable to chose an internal grain system in which the size of grains to be deposited can be made relatively small.

Furthermore, in order to improve transparency of the film, it is also preferable to supply such grains only to the outermost layer of the laminate film according to the present invention.

Moreover, the Tg of the polyester constituting a laminate composition according to the present invention is preferably 80° C. to 200° C., more preferably 90° C. to 180° C., and further preferably 105° C. to 150° C. When the temperature of Tg is lower than the above-described range, such temperature is lower than the maximum temperature at which photosensitive materials are placed (i.e., 80° C.; the temperature in a car in the summer season). Therefore a strong core set curl is formed in a cartridge, and that is not preferable. On the other hand, a transparent wide-use polyester film, which indicates Tg being higher than the above-described temperature range, is not yet available.

With respect to the layer composition of the polyester support that is used in the present invention, preferably at least one layer thereof is a polyester that is made from a naphthalene dicarboxylic acid and ethyleneglycol as main components, and more preferably polyethylene-2,6-naphthalete (PEN). These materials are preferred because they have considerably high mechanical strength, superior to PET, and in addition, they have a great advantage in that the Tg is as high as 120° C. and that a core set curl is hardly formed, even at a high temperature.

Preferable examples of the layer constitution of the laminate compositions for use in the present invention are shown below, to which the present invention is not limited.

| Preferable Examples of the Layer Constitution | | |
|---|---|---|
| Sample No. | Material | Thickness (μm) |
| (1) Two-Layer Film | | |
| F2-1  | 1-1/2-2  | 60/30 |
| F2-2  | 1-1/2-2  | 45/45 |
| F2-3  | 1-1/2-2  | 30/60 |
| F2-4  | 1-1/2-2  | 40/50 |
| F2-5  | 1-1/2-2  | 45/55 |
| F2-6  | 1-1/2-2  | 35/45 |
| F2-7  | 1-1/2-3  | 40/50 |
| F2-8  | 1-1/2-5  | "     |
| F2-9  | 1-1/2-6  | "     |
| F2-10 | 1-1/3-10 | 40/50 |
| F2-11 | 1-1/3-10 | 45/55 |
| F2-12 | 1-1/3-10 | 35/45 |
| F2-13 | 1-1/3-3  | 40/50 |
| F2-14 | 1-1/3-5  | "     |
| F2-15 | 1-1/3-6  | "     |
| F2-16 | 2-2/2-3  | 50/40 |
| F2-17 | 2-5/2-3  | "     |
| F2-18 | 2-6/2-3  | "     |
| F2-19 | 3-5/3-3  | "     |
| F2-20 | 3-6/3-7  | "     |
| F2-21 | 3-10/3-3 | "     |
| F2-22 | 2-2/3-3  | "     |
| F2-23 | 2-5/3-3  | "     |
| F2-24 | 2-6/3-3  | "     |

-continued

| Preferable Examples of the Layer Constitution | | |
|---|---|---|
| Sample No. | Material | Thickness (μm) |
| (2) Three-Layer Film | | |
| F3-1 | 1-1/2-3/2-2 | 30/30/30 |
| F3-2 | 1-1/2-6/2-5 | " |
| F3-3 | 1-1/2-7/2-8 | " |
| F3-4 | 1-1/3-3/3-10 | " |
| F3-5 | 1-1/3-6/3-5 | " |
| F3-6 | 1-1/3-9/3-8 | " |
| F3-7 | 1-1/2-6/3-5 | " |
| (3) Four-Layer Film | | |
| F4-1 | 1-1/2-6/2-2/2-1 | 23/23/23/23 |
| F4-2 | 1-1/3-3/3-2/3-1 | " |
| F4-3 | 1-1/3-6/3-5/3-4 | " |
| F4-4 | 1-1/2-6/3-10/2-1 | " |

The method for a heat treatment to prevent core set curls that can be applied in the present invention is described below.

A laminate polyester film of the present invention formed by the above-described method is treated with heat at a temperature of, preferably, from 50° C. to the Tg of the polyester having the highest Tg, i.e., Tg/H, more preferably from 60° C. to Tg/H, and further preferably from 70° C. to Tg/H. Thereby core set curls can be prevented. As a result, films providing much more excellent handling can be obtained by the heat treatment.

Such a heat treatment can be carried out at a constant temperature within the above-described range, or alternatively while elevating or cooling the temperature. It is preferable to heat-treat at the constant temperature or while cooling. An average cooling speed is preferably from −0.01 to −20° C./hour, more preferably from −0.1 to −10° C./hour, and further preferably from −0.2 to 5° C./hour. The period of time for the heat treatment is preferably from 0.1 to 1,500 hours, more preferably from 0.2 to 400 hours, and further preferably from 0.5 to 200 hours. When the period is too short, a sufficient effect cannot be obtained. On the other hand, when the period is too long, the effect is saturated and the support is apt to be colored or become brittle.

In order to further improve the effect on prevention of the core set curl, it is preferred to heat-treat at a temperature of Tg or higher, but lower than Tm, prior to the above-described heat treatment, so as to remove thermal hysteresis of the support. Then a reheat treatment is performed at the above-described temperature of from 50° C. to Tg/H.

In the present invention, this heat treatment is referred to as "preheat treatment," and the above-described heat treatment at the temperature of from 50° C. to Tg/H is referred to as "post-heat treatment." Thus, these treatments are distinguished from each other. Therefore the heat treatment of the present invention can be divided to these preheat treatment and post-heat treatment.

The temperature for the preheat treatment is preferably Tg/H or higher, but lower than the lowest melting point of polyesters that constitute the laminate, and more preferably Tg/H +20° C. or higher, but not higher than the crystallization temperature (measured by DSC). When the preheat treatment is carried out at a melting point or higher temperature, problems related to a surface slate and conveyance of the support are caused due to a considerable reduction of elasticity of the support. The preheat treatment can be performed, within the above-described temperature range, at a constant temperature (a fixed-temperature preheat treatment), or while lowering the temperature (a lowered-temperature preheat treatment), or while elevating the temperature (an elevated-temperature preheat treatment).

The period of time for the preheat treatment is preferably from 0.1 minute to 1,500 hours, and more preferably from 1 minute to 1 hour. When the period is too short, a sufficient effect cannot be obtained. On the other hand, when the period is too long, the effect is saturated and the support is apt to be colored or become brittle.

The post-heat treatment is carried out after the preheat treatment. The system may be rapidly cooled from the temperature at which the preheat treatment is completed to the temperature at which the post-heat treatment is initiated. Alternatively, the system may be gradually cooled, through the Tg to the temperature at which the post-heat treatment is initiated. Alternatively, the system may be cooled to room temperature and then heated to the temperature at which the post-heat treatment is initiated.

There are several combinations of the preheat treatment and the post-heat treatment. Of these combinations, preferably the preheat treatment is carried out at a constant temperature between Tg/H +20° C. and a crystallization temperature, followed by the post-heat treatment carried out while cooling at the cooling speed of −0.1 to −5° C./hour at the temperature range of from Tg/H to (Tg/liter)−20° C., which Tg is the lowermost Tg of materials constituting a laminate film.

When a support subjected to the thus post-heat treatment or the preheat treatment and then the post-heat treatment is measured by DSC, there arises an endothermic peak having a maximum between Tg/liter −20° C. and Tg/H +80° C. As the area of the endothermic peak (endothermic amount) enlarges, formation of the core set curl becomes more difficult.

When 10 mg of a sample is measured by DSC while heating at the rate of 20° C./minute in a nitrogen stream, preferably the endothermic amount is 100 mcal/g or more, but 1,000 mcal/g or less. When the endothermic amount is less than the above range, a sufficient core set curl cannot be obtained. On the other hand, when the endothermic amount is more than the above range, a core set curl-preventing effect is saturated. A more preferable range is from 150 mcal/g to 500 mcal/g, and further preferably from 200 mcal/g to 400 mcal/g.

It is considered that such a heat treatment of a support can be carried out while conveying a roll-like or web-like support. The heat treatment of the roll-like support may be carried out by a method of heat-treating a roll at the temperature of from room temperature to a temperature of a thermostatic bath (hereinafter referred to as a low-temperature rolling method), or a method of heat treating a roll that is obtained by rolling a web-like support heated at a definite temperature during a conveyance of the web (hereinafter referred to as a high-temperature rolling method). The former method has an advantage of a low equipment investment, while a longer time is necessary to elevate or lower the temperature. On the other hand, the latter method has an advantage in that the time required for elevating the temperature can be omitted, while a rolling equipment maintaining high temperature is necessary.

However, the heat treatment of the roll-like support has a drawback in that heat contractile stress, generated during the above-described heat treatment, is apt to cause troubles on the surface of the support, such as wrinkles due to tightness of the roll, and a trouble of deformation of the support. The trouble of deformation of the support means that, when a support is wound on a core, on its second and further winding, the support follows unevenness of its cut edge of the first winding, deforming its flat film-shape. On the other hand, the heat treatment of the web-like support has a practical problem, since huge heat-treatment facilities are necessary to attain a sufficient heat-treatment effect. As mentioned above, each of these two methods has advantages and disadvantages. The effects of the present invention can be obtained by each of these methods, and the former, i.e., heat treatment of the roll-like support, is preferable to the latter, i.e., that of the web-like support, in view of productivity on an industrial scale.

When heat treatment of the roll-like support is carried out, as in the former method, the initial tension of the roll tension per unit of width of the roll is preferably from 3 kg/m to 75 kg/m, more preferably from 10 kg/m to 40 kg/m, and further preferably from 12 kg/m to 30 kg/m. On the other hand, the final tension of the roll tension is preferably to be from 3 kg/m to 75 kg/m, more preferably from 5 kg/m to 35 kg/m, and further preferably from 7 kg/m to 30 kg/m. When the tension is lower than the above-described range, a roll is apt to loosen by its own weight and change its shape due to a loose wind during a heat treatment. On the other hand, when the tension is higher than the above-described range, wrinkles are easily caused due to a tight wind. Preferably the initial tension is larger than the final tension. Further, it is preferable to roll so that the surface of the support on which a back layer is to be coated, is located inside.

Moreover, the diameter of the reel for winding the support is preferably from 50 mm to 2,000 mm, more preferably from 100 mm to 1,000 mm, and further preferably from 150mm to 600 mm. When the diameter is larger than the above range, handling, such as transportation, becomes difficult. On the other hand, when the diameter is shorter than the above range, the number of times for winding the support increases, so that heat contraction stress, which the support near the reel receives, is apt to become high and deterioration of the flatness is easily caused.

The quality of the material for a roll reel that is used in a heat treatment is not limited. However, preferably the materials are not reduced in strength or modified due to heat. Examples of such materials are stainless steel, aluminum, and a resin containing a glass fiber. Optionally, gum and resins may be coated on the reel. Further, these roll reels may have a hollow structure, in order to increase the efficiency of the transmission of temperature to a film, or alternatively they may have an electric heater built-in for heating, or a structure in which a hot liquid can be flowed.

Such a heat treatment may be carried out at any stage between a film production and a coating of light-sensitive layers. However, it is preferable to perform it before an undercoating layer for light-sensitive layer is coated on a support, but after the support is subjected to a surface treatment.

A silver halide photosensitive material (hereinafter referred to as a photosensitive material) having the above-described laminate compositions according to the present invention as a support, is explained below.

When these polyester films are used as the support, each of these polyester films has a hydrophobic surface. Therefore it is difficult to coat, with strong adhesion, on the support, a photosensitive layer and a back layer, each composed of a protective (hydrophilic) colloid containing gelatin as a main component, unless the support is subjected to surface treatment. Known technique that are proposed to overcome this problems are a corona discharge treatment, a flame treatment, an ultraviolet ray treatment, and a glow discharge treatment, all of which are effective. Among these treatments, the ultraviolet ray treatment, and the glow discharge treatment are particularly effective, and the glow discharge treatment is most effective.

These surface treatments can be performed according to the methods described in HATSUMEI KYOKAI KOKAIGIHO (J III Journal of Technical Disclosure) No. 94-6023, pages 18 to 22 (6. Undercoating.Back materials).

An undercoating layer positioned between the surface-treated support and a photosensitive layer, is explained below.

As the undercoating, there can be used a so-called laminate method, which comprises steps of coating on a support a first layer having good adhesiveness with the support (hereinafter referred to as the first undercoating layer), and then coating thereon a second layer having a good adhesiveness with the first undercoating layer and a photosensitive layer (hereinafter referred to as the second undercoating layer). Alternatively, use can be made of a single-layer method, which comprises coating on a support only one layer, which is excellent in adhesiveness between the support and a photosensitive layer.

The undercoating can be performed according to the methods described in HATSUMEI KYOKAI KOKAIGIHO No. 94-6623, pages 18 to 22 (6. Undercoating.Back materials).

It is preferable to apply an antistatic layer to the support of the present invention. An antistatic agent to be used is not particularly limited, and may be a conductive antistatic agent or a compound that provides an adjustment function of electrification.

Example conductive antistatic agents are metal oxides and ionic compounds. Preferable ones among these used in the present invention are conductive metal oxides and derivatives thereof, conductive metals, carbon fibers, and $\pi$-conjugate high-molecular-weight compounds (e.g., polyarylene vinylene), each of which keep their antistatic function even after development processing. Among these compounds, a particularly preferable conductive material is crystalline metal oxide grains.

A coating of these antistatic agents can be performed according to the methods described in HATSUMEI KYOKAI KOKAIGIHO No. 94-6023, pages 22 to 25 (7. Antistatic agent).

Further, the silver halide photosensitive material according to the present invention may have a magnetic recording layer, as described in JP-A No. 59357/1994, in order to record a variety of information. The magnetic recording layer is preferably applied to the back side of the support, by coating or printing. Alternatively, an optically recording space can be applied to the photosensitive material, in order to optically record a variety of information.

Furthermore, a variety of functions are given to the support of the present invention. For example, a lubricant layer can be applied thereto. Known examples of the lubricant are a ployorganosiloxane, as disclosed in JP-B ("JP-B" means a published and examined Japanese Patent Application) No. 292/1978; a higher fatty acid amide, as disclosed in U.S. Pat. No. 4,275,146; a higher fatty acid ester (an ester of a fatty acid having 10 to 24 carbon atoms and an alcohol having 10 to 24 carbon atoms), as disclosed in JP-B No.33541/1983, GB Patent No. 927,446, JP-A Nos. 126238/1980 and 90633/1983; a metal salt of a higher fatty acid, as disclosed in U.S. Pat. No. 3,933,516; an ester of a straight-chain higher fatty acid and a straight-chain higher alcohol, as disclosed in JP-A No. 50534/1983; and an ester of a higher fatty acid containing a branched alkyl group, and a higher alcohol, as disclosed in WO No. 90108115.8.

Application of the lubricant layer can be performed according to the methods described in HATSUMEI KYOKAI KOKAIGIHO No. 94-6023, pages 25 to 28 (7. Lubricants).

Photographic layers of the photosensitive material according to the present invention are described below.

A silver halide emulsion layer may be for color or black-and-white photography. Preparation of these emulsion layers can be performed according to the methods described in HATSUMEI KYOKAI KOKAIGIHO No. 94-6023, pages 79 to 83 (16. Photosensitive layers).

The thus obtained films are used as a roll obtained by spooling them in a cartridge. It is preferable to use a spool having a diameter (an outer diameter) of from 5 to 11 mm, more preferably from 6 to 10 mm, and further preferably from 7 to 9 mm. When the spool is smaller than the above-described range, the core set curl becomes too strong and thereby problems are apt to arise in a mini-lab. On the other hand, when the spool is larger than the above range, it is difficult to miniaturize a cartridge.

Measurements of the physical properties described in this specification are explained below.

1. Glass Transition Temperature (Tg) and Melting Temperature (Tm)

The Tg used in the present invention can be measured using a scanning-type differential thermal analyzer (DSC). That is, first, 10 mg of a sample is heated in a nitrogen current, to 300° C., at the rate of 20° C./minute (1st run), and then it is cooled to room temperature; thereby an amorphous body is formed. After that, when the amorphous body is heated again at the rate of 20° C./minute (2nd run), the Tg can be calculated by the arithmetic mean of the temperature that begins to deviate from the base line and the temperature that returns to the new base line. The Tm is defined as the temperature that indicates the highest point of the melting peak.

2. Crystallization Degree ($\chi c$)

The $\chi C$ of the outermost layer was calculated using DSC according to the following method.

(1) 5 Milligrams of the outermost layer of the sample film is shaved off using a razor.

(2) The shaved part is heated in a nitrogen current, at the rate of 20° C./minute, from room temperature to 330° C., and then it is subjected to DSC measurement, to obtain the heat of fusion (1st run).

(3) The $\chi C$ is calculated by the following equation.

$$\chi C = \frac{\text{heat of fusion of the sample}}{\text{heat of fusion of the crystal}}$$

The heat of fusion of the crystal is obtained by the following method. First, 10 mg of the sample is heated, in a nitrogen current in a DSC at 300° C., at the rate of 20° C./minute (1run), and then it is cooled to room temperature; thereby an amorphous body is formed. The amorphous body is subjected to isothermal crystallization at the crystallization temperature (i.e., the temperature that indicates the highest point of heat generation peak observed in the 2nd run using the DSC), until no generation of heat is observed. This heat of fusion, measured by the above method, is defined as the heat of fusion of the crystal.

The present invention is explained in more detail by means of the following examples, which, however, are not intended to restrict the scope of the present invention.

EXAMPLE 1

1) Preparation of the Support
Laminate Composition

The polyesters shown in Table 1 were polymerized according to an ordinary transesterfication. These polyesters were fused at 310° C. using an extruding machine. Then, laminate polyester films, each having a total layer thickness of 90 μm, composed of PEN/copolymer polyester and PEN/blend polyester, were respectively obtained by a co-extrusion process according to the combinations shown in Table 1.

These films were subjected to biaxial stretching according to the conditions shown in Table 1. Then the films were moved to the heat-fixing zone (the temperature range in the zone: the difference between the highest temperature and the lowest temperature was 10° C.), which was maintained at a temperature of 230° C. by blowing hot air, and the films were subjected to heat-fixing for 6 seconds, while being performed 5% of relaxation. Then the films were cooled to 40° C. and rolled, to obtain biaxial stretching laminate films, each having a specific thickness and a difference in the crystallization degree between the surface side and the back side, as shown in Table 1.

The thus produced films had such characteristics that a phase having high intrinsic viscosity was curled on the inside, while another phase having low intrinsic viscosity was curled on the outside.

Single-Layer Composition

As comparative examples, single-layer biaxial stretching films were also prepared. Each of them was 90 μm in thickness.

PAr is a polyarylate [TPA/BPA (100/100)] having the Tg of 192° C. and not having the "Tm". (PAr was suddenly softened when it became a temperature over its Tg.)

TABLE 1

| Sample No. | Layer Construction Polyester A/B* | Tg °C. | Tm °C. | Condition of Longitudinal Stretching | | Condition of Horizontal Stretching | | Heat-fixing °C. |
|---|---|---|---|---|---|---|---|---|
| | | | | Temperature °C. | Magnitude | Temperature °C. | Magnitude | |
| 101 | 2-1(90) | 91 | 254 | 120 | 3.2 | 110 | 3.8 | 230 |
| 102 | 1-1(45)/2-1(45) | 119/91 | 268/254 | 140 | 3.3 | 130 | 3.6 | " |
| 103 | " | " | " | " | " | " | " | " |
| 104 | 1-1(45)/2-3(45) | 119/117 | 268/242 | " | " | " | " | " |
| 105 | " | " | " | " | " | " | " | " |
| 106 | 1-1(45)/4-1(45) | 119/82 | 268/253 | " | " | " | " | " |
| 107 | " | " | " | " | " | " | " | " |
| 108 | 2-4(90) | 130 | 242 | 150 | 3.2 | 142 | 3.7 | " |
| 109 | 1-1(45)/2-4(45) | 119/130 | 268/242 | " | " | " | " | " |
| 110 | " | " | " | " | " | " | " | " |
| 111 | 1-1(45)/2-6(45) | 119/121 | 268/260 | 141 | 3.3 | 133 | 3.6 | " |

TABLE 1-continued

| | | | | | | | | |
|---|---|---|---|---|---|---|---|---|
| 112 | " | " | " | " | " | " | " | " |
| 113 | 3-1(90) | 93 | 253 | 112 | 3.4 | 103 | 3.5 | " |
| 114 | 1-1(45)/3-1(45) | 119/93 | 268/253 | 140 | 3.3 | 130 | 3.6 | " |
| 115 | " | " | " | " | " | " | " | " |
| 116 | 1-1(45)/3-3(45) | 119/116 | 268/265 | " | " | " | " | " |
| 117 | " | " | " | " | " | " | " | " |
| 118 | 1-1(45)/4-2(45) | 119/82 | 268/252 | 102 | 3.2 | 95 | 3.7 | " |
| 119 | " | " | " | " | " | " | " | " |
| 120 | 3-3(90) | 116 | 265 | 140 | 3.3 | 130 | 3.6 | " |
| 121 | 1-1(45)/3-4(45) | 119/153 | 268/244 | 161 | 3.2 | 158 | 3.4 | " |
| 122 | " | " | " | " | " | " | " | " |
| 123 | 3-6(90) | 121 | 259 | 145 | 3.2 | 135 | 3.6 | " |
| 124 | 1-1(45)/3-6(45) | 119/121 | 268/259 | " | " | " | " | " |
| 125 | " | " | " | " | " | " | " | " |

| Sample No. | $\chi CA - \chi CB \over \chi CA$ | Conditions of heat treatment | Transverse curl 1/R (m$^{-1}$) | Core set curl after development 1/R (m$^{-1}$) |
|---|---|---|---|---|
| 101 | — | 85° C., 40 hrs. | x | 51 |
| 102 | 1 | Slow cooling for 10 hrs. from 130° C. to 80° C. | o | 47 |
| 103 | " | No treatment | o | 135 |
| 104 | 0.53 | 110° C., 40 hrs. | o | 44 |
| 105 | " | No treatment | o | 124 |
| 106 | 1 | Slow cooling for 15 hrs. from 130° C. to 50° C. | o | 162 |
| 107 | " | No treatment | o | 193 |
| 108 | — | 120° C., 40 hrs. | x | 39 |
| 109 | 1 | Slow cooling for 20 hrs. from 150° C. to 90° C. | o | 40 |
| 110 | " | No treatment | o | 120 |
| 111 | 0.56 | 110° C., 40 hrs. | o | 41 |
| 112 | " | No treatment | o | 121 |
| 113 | — | 85° C., 40 hrs. | x | 49 |
| 114 | 1 | Slow cooling for 15 hrs. from 130° C. to 55° C. | o | 46 |
| 115 | " | No treatment | o | 128 |
| 116 | 0.72 | 110° C., 40 hrs. | o | 42 |
| 117 | " | No treatment | o | 126 |
| 118 | 1 | Slow cooling for 15 hrs. from 130° C. to 50° C. | o | 160 |
| 119 | " | No treatment | o | 185 |
| 120 | — | 110° C., 40 hrs. | x | 42 |
| 121 | 1 | Slow cooling for 30 hrs. from 180° C. to 90° C. | o | 31 |
| 122 | " | No treatment | o | 96 |
| 123 | — | 110° C., 40 hrs. | x | 45 |
| 124 | 0.61 | " | o | 46 |
| 125 | " | No treatment | o | 115 |

| | Development processing trouble | | |
|---|---|---|---|
| Sample No. | Unevenness | Breakage | Remarks |
| 101 | o | o | Comparative example |
| 102 | o | o | This invention |
| 103 | x | x | " |
| 104 | o | o | " |
| 105 | x | x | " |
| 106 | x | x | Comparative example |
| 107 | x | x | " |
| 108 | o | o | " |
| 109 | o | o | This invention |
| 110 | x | x | " |
| 111 | o | o | " |
| 112 | x | x | " |
| 113 | o | o | Comparative example |
| 114 | o | o | This invention |
| 115 | x | x | " |
| 116 | o | o | " |
| 117 | x | x | " |
| 118 | x | x | Comparative example |
| 119 | x | x | " |
| 120 | o | o | " |
| 121 | o | o | This invention |
| 122 | Δ | x | " |
| 123 | o | o | Comparative example |
| 124 | o | o | This invention |
| 125 | x | x | " |

Note:
*Figures in parenthesis mean thickness in terms of μm.

2) Heat Treatment and Surface Treatment of the Support

The films obtained by the above-described method were subjected to heat treatment under the conditions shown in Table 1. Each heat treatment was carried out by setting the film on a reel of 30 cm diameter, so that the side on which undercoating layer was coated would be positioned on the outside.

After that, both surfaces of all film supports were subjected to glow discharge treatment under decompression of 0.2 Torr ($H_2O$ partial pressure 80 mol %), and with the treatment intensity of 0.5 KV.A.minute/$m^2$ at 2,500 W of generating power. The base preheating temperature was set at 90° C. for each time of the treatment.

3) Coating of the Undercoating Layer (the side on which emulsion layers are coated)

An undercoating solution having the following compositions was coated on each of the supports shown in Table 1, so that the coating amount of the solution was 10 ml/$m^2$. Then each of the supports was dried at the temperature of Tg-5° C. for 10 minutes.

| Composition | |
|---|---|
| Gelatin | 1.0 weight parts |
| Salicylic acid | 0.3 weight parts |
| Resorcin | 1.0 weight parts |
| Compound 6 | 0.05 weight parts |
| Compound G | 0.1 weight parts |
| $HO-CO\{(CH_2)_4CONH(CH_2)_2\overset{H^+}{N}(CH_2)_2NH\}_4HCl^-$ $\quad\quad\quad\quad\quad\quad\quad\quad\quad CH_2CHCH_2Cl$ $\quad\quad\quad\quad\quad\quad\quad\quad\quad\quad OH$ | |
| Polyoxyethylenenonyl phenylether (polymerization degree 10) | |
| Water | 2.2 weight parts |
| Methanol | 95.35 weight parts |

4) Coating of the Back Layer

The composition for the back layer having the following was coated on the face of the opposite side of the support on which an undercoating layer had been coated.

(4-1) Preparation of Solution Wherein Conductive Fine Grains Are Dispersed (Dispersion Solution of Tin Oxide-Antimony Oxide Complex)

Stannic chloride hydrate (230 weight parts) and antimony trichloride (23 weight parts) were dissolved in ethanol (3,000 weight parts), to obtain a homogeneous solution. A 1N sodium hydroxide aqueous solution was added dropwise to this solution, until the pH value of the solution reached 3, to obtain a coprecipitate of colloidal stannic oxide and antimony oxide. The thus obtained coprecipitate was kept for 24 hours at 50° C., so that a reddish brown colloidal precipitate was obtained. The average grain size of the colloidal precipitate was 0.05 μm.

The reddish brown colloidal precipitate was separated by centrifugation. In order to remove superfluous ions, water was added to the precipitate, and then the precipitate was washed by centrifugation. This operation was repeated three times, to remove the superfluous ions.

The colloidal precipitate (200 weight parts) from which the superfluous ions were removed, was dispersed again in water (1,500 weight parts), and then it was atomized in a furnace that had been heated to 500° C., to obtain bluish complex grains of stannic oxide and antimony oxide, as fine grains having an average grain size of 0.005 μm. The resistance coefficient of these powdered fine grains was 25 Ω.cm.

The pH value of a mixed solution containing the above-described powdered fine grains (40 weight parts) and water (60 weight parts) was adjusted to 7, and then the solution was roughly dispersed by an agitator. After that, the dispersion was finely dispersed by a horizontal sandmill (DYNOMILL, manufactured by Willy A. Backfen AG), until the staying time reached 30 minutes. The average grain size of the secondary grain aggregate was 0.15 μm.

(4-2) Coating of Antistatic layer

The composition of the following recipe was coated, so as to make the thickness of the dried layer 0.2 μm, followed by drying, at the temperature of Tg-5° C. for 30 seconds. At this time, it was identified that the internal temperature of the casing in the conveyance system and the substantial temperature of the conveying roller were each Tg-5° C.

| | |
|---|---|
| Conductive fine grain dispersion solution ($SnO_2/Sb_2O_3$, 0.10 μm) | 10 weight parts |
| Gelatin | 1 weight parts |
| Water | 27 weight parts |
| Methanol | 60 weight parts |
| Resorcin | 2 weight parts |
| Polyoxyethylenenonyl phenylether (polymerization degree 10) | 0.01 weight parts |

(4-3) Coating of Back Layer

Further, a back dispersion coating solution was prepared, using diacetyl cellulose as a binder, according to the following recipe.

| | |
|---|---|
| Silicon dioxide (Average grain size 0.3 μm) | 0.01 weight parts |
| Aluminum oxide | 0.03 weight parts |
| Diacetyl cellulose | 1.0 weight parts |
| Methyl ethyl ketone | 9.4 weight parts |
| Cyclohexanone | 9.4 weight parts |
| Polyoxyethyleneparanonyl phenylether (polymerization degree 10) | 0.06 weight parts |
| Trimethylolpropane (tris(tolylene diisocyanate) | 0.03 weight parts |
| Colloidal silica (AEROSIL, trade name, manufactured by Nippon Aerosil k.k., having average grain size 0.02 μm) | 0.02 weight parts |
| $C_8F_{17}SO_2N(CH_3)(CH_2CH_2O)_6H$ | 0.01 weight parts |
| Poly(vinylidene difluoride/vinylidene tetrafluoride)(Molar ratio 9:1) | 0.01 weight parts |
| Poly(methylmethacryrate/divinylbenzene) (Molar ratio 9:1, Average grain size 1.0 μm) | 0.01 weight parts |

Dispersion was carried out at 2,000 r.p.m. for 2 hours by means of a sand grinder. Glass beads were used as a dispersion medium.

To the thus obtained solution, was added a toluenediisocyanate compound, in an amount of 30% based on the binder, and then the solution was coated using a bar coater, on an antistatic layer previously coated, so as to make a coating amount of diacetylcellulose (solid state) 0.3 g/$m^2$, followed by drying at 115° C. for 3 minutes. At this time, it was identified that the internal temperature of the casing in the conveyance system and the substantial temperature of the conveying roller were each 115° C.

(4-4) Coating of Lubricant Layer

Preparation of Lubricant Dispersion Solution

The following two kinds of lubricant were mixed in a 4:1 ratio, and xylene was added thereto, in the same weight as the lubricant, and then the mixture was dissolved by heating at 100° C. After that, to this solution, while stirring and applying supersonic waves, isopropanol (room temperature) was immediately added, in a weight amount of ten times as much as the lubricant solution, to prepare a dispersion solution. Further, this dispersion solution was diluted with xylene/cyclohexanone/isopropanol (70/25/5 weight ratio), and then the solution was finely dispersed by means of a high pressure homogenizer (25° C., 300 kg/cm$^2$), so as to make the concentration of the lubricant 0.1 weight %. The solution was coated on a back layer previously coated. Coating was carried out by a slide coating method with 15 mg/m$^2$. Drying was performed at 115° C. for 5 minutes. At that time, it was identified that the internal temperature of the casing in the conveyance system and the substantial temperature of the conveying roller were each 115° C.

| | |
|---|---|
| n-$C_{17}H_{35}COOC_{30}H_{61}$-n | 4 weight parts |
| n-$C_{30}H_{61}O(CH_2CH_2O)_{10}H$ | 1 weight parts |

5) Preparation of Photosensitive Material

Layers, each having the compositions described below, were multi-coated on a support having on it an undercoating layer (opposite side of the back layer), to prepare samples (multi-layer color photosensitive materials).

(Compositions of Photosensitive Layers)

Main materials used in each layer were classified as follows:

ExC: Cyan coupler

ExM: Magenta coupler

ExY: Yellow coupler

ExS: Sensitizing dye

UV: Ultraviolet ray absorbent

HBS: High-boiling organic solvent

H: Gelatin hardening agent

Figures corresponding to each component represents the coating amount in terms of g/m$^2$, and for silver halide in terms of silver. With respect to sensitizing dyes, the coating amount is shown in mol per mol of silver halide in the same layer.

| First Layer (Halation-preventing layer) | |
|---|---|
| Black colloidal silver | silver 0.18 |
| Gelatin | 1.40 |
| ExM-1 | 0.18 |
| ExF-1 | $2.0 \times 10^{-3}$ |
| HBS-1 | 0.20 |

| Second Layer (Intermediate layer) | |
|---|---|
| Silver bromoiodide emulsion G | silver 0.065 |
| 2,5-di-t-pentadecylhydroquinone | 0.18 |
| ExC-2 | 0.020 |
| UV-1 | 0.060 |
| UV-2 | 0.080 |
| UV-3 | 0.10 |
| HBS-1 | 0.10 |
| HBS-2 | 0.020 |
| Gelatin | 1.04 |

| Third Layer (Low sensitivity red-sensitive emulsion layer) | |
|---|---|
| Silver bromoiodide emulsion A | silver 0.25 |
| Silver bromoiodide emulsion B | silver 0.25 |
| ExS-1 | $6.9 \times 10^{-5}$ |
| ExS-2 | $1.8 \times 10^{-5}$ |
| ExS-3 | $3.1 \times 10^{-4}$ |
| ExC-1 | 0.17 |
| ExC-3 | 0.030 |
| ExC-4 | 0.10 |
| ExC-5 | 0.020 |
| ExC-7 | 0.0050 |
| ExC-8 | 0.010 |
| Cpd-2 | 0.025 |
| HBS-1 | 0.10 |
| Gelatin | 0.87 |

-continued

| Fourth Layer (Medium sensitivity red-sensitive emulsion layer) | |
|---|---|
| Silver bromoiodide emulsion D | silver 0.70 |
| ExS-1 | $3.5 \times 10^{-4}$ |
| ExS-2 | $1.6 \times 10^{-5}$ |
| ExS-3 | $5.1 \times 10^{-4}$ |
| ExC-1 | 0.13 |
| ExC-2 | 0.060 |
| ExC-3 | 0.0070 |
| ExC-4 | 0.090 |
| ExC-5 | 0.025 |
| ExC-7 | 0.0010 |
| ExC-8 | 0.0070 |
| Cpd-2 | 0.023 |
| HBS-1 | 0.10 |
| Gelatin | 0.75 |

| Fifth Layer (High sensitivity red-sensitive emulsion layer) | |
|---|---|
| Silver bromoiodide emulsion E | silver 1.40 |
| ExS-1 | $2.4 \times 10^{-4}$ |
| ExS-2 | $1.0 \times 10^{-4}$ |
| ExS-3 | $3.4 \times 10^{-4}$ |
| ExC-1 | 0.12 |
| ExC-3 | 0.045 |
| ExC-6 | 0.020 |
| ExC-8 | 0.025 |
| Cpd-2 | 0.050 |
| HBS-1 | 0.22 |
| HBS-2 | 0.10 |
| Gelatin | 1.20 |

| Sixth Layer (Intermediate layer) | |
|---|---|
| Cpd-1 | 0.10 |
| HBS-1 | 0.50 |
| Gelatin | 1.10 |

| Seventh Layer (Low sensitivity green-sensitive emulsion layer) | |
|---|---|
| Silver bromoiodide emulsion C | silver 0.35 |
| ExS-4 | $3.0 \times 10^{-5}$ |
| ExS-5 | $2.1 \times 10^{-4}$ |
| ExS-6 | $8.0 \times 10^{-4}$ |
| ExM-1 | 0.010 |
| ExM-2 | 0.33 |
| ExM-3 | 0.086 |
| ExY-1 | 0.015 |
| HBS-1 | 0.30 |
| HBS-3 | 0.010 |
| Gelatin | 0.73 |

| Eighth Layer (Medium sensitivity green-sensitive emulsion layer) | |
|---|---|
| Silver bromoiodide emulsion D | silver 0.80 |
| ExS-4 | $3.2 \times 10^{-5}$ |
| ExS-5 | $2.2 \times 10^{-4}$ |
| ExS-6 | $8.4 \times 10^{-4}$ |
| ExM-2 | 0.13 |
| ExM-3 | 0.030 |
| ExY-1 | 0.018 |
| HBS-1 | 0.16 |
| HBS-3 | $8.0 \times 10^{-3}$ |
| Gelatin | 0.90 |

| Ninth Layer (High sensitivity green-sensitive emulsion layer) | |
|---|---|
| Silver bromoiodide emulsion E | silver 1.25 |
| ExS-4 | $3.7 \times 10^{-5}$ |
| ExS-5 | $8.1 \times 10^{-5}$ |
| ExS-6 | $3.2 \times 10^{-4}$ |
| ExC-1 | 0.010 |
| ExM-1 | 0.030 |
| ExM-4 | 0.040 |
| ExM-5 | 0.019 |
| Cpd-3 | 0.040 |
| HBS-1 | 0.25 |
| HBS-2 | 0.10 |
| Gelatin | 1.44 |

Tenth Layer (Yellow filter layer)

| | |
|---|---|
| Yellow colloidal silver | silver 0.030 |
| Cpd-1 | 0.16 |
| HBS-1 | 0.60 |
| Gelatin | 0.60 |

Eleventh Layer (Low sensitivity blue-sensitive emulsion layer)

| | |
|---|---|
| Silver bromoiodide emulsion C | silver 0.18 |
| ExS-7 | $8.6 \times 10^{-4}$ |
| ExY-1 | 0.020 |
| ExY-2 | 0.22 |

-continued

| | |
|---|---|
| ExY-3 | 0.50 |
| ExY-4 | 0.020 |
| HBS-1 | 0.28 |
| Gelatin | 1.10 |

Twelfth Layer (Medium sensitivity blue-sensitive emulsion layer)

| | |
|---|---|
| Silver bromoiodide emulsion D | silver 0.40 |
| ExS-7 | $7.4 \times 10^{-4}$ |
| ExC-7 | $7.0 \times 10^{-3}$ |
| ExY-2 | 0.050 |
| ExY-3 | 0.10 |
| HBS-1 | 0.050 |
| Gelatin | 0.78 |

Thirteenth Layer (High sensitivity blue-sensitive emulsion layer)

| | |
|---|---|
| Silver bromoiodide emulsion F | silver 1.00 |
| ExS-7 | $4.0 \times 10^{-4}$ |
| ExY-2 | 0.10 |
| ExY-3 | 0.10 |
| HBS-1 | 0.070 |
| Gelatin | 0.86 |

Fourteenth Layer (First protective layer)

| | |
|---|---|
| Silver bromoiodide emulsion G | silver 0.20 |
| UV-4 | 0.11 |
| UV-5 | 0.17 |
| HBS-1 | $5.0 \times 10^{-2}$ |
| Gelatin | 1.00 |

Fifteenth Layer (Second protective layer)

| | |
|---|---|
| H-1 | 0.40 |
| B-1 (diameter: 1.7 μm) | $5.0 \times 10^{-2}$ |
| B-2 (diameter: 1.7 μm) | 0.10 |
| B-3 | 0.10 |
| S-1 | 0.20 |
| Gelatin | 1.20 |

Further, in order to improve preservability, processability, pressure resistance, antimold and antibacterial properties, antistatic property, and coating property, compounds of W-1 to W-3, B-4 to B-6, and F-1 to F-17, and salts of iron, lead, gold, platinum, iridium, and rhodium were suitably added in each layer.

Details of emulsions used in this Example are shown in Table 2.

TABLE 2

| | Average AgI content (%) | Grain Size | | Ratio of silver amount | | Grain structure and shape |
|---|---|---|---|---|---|---|
| | | Average Diameter (μm) | Deviation coefficient (%) | Ratio of Diameter/ Thickness | [core/shell] or [core/intermediate/ shell] (AgI content %) | |
| Emulsion A | 4.0 | 0.45 | 27 | 1 | [1/3] (13/1) | Double structure octahedral grains |
| Emulsion B | 8.9 | 0.90 | 14 | 1 | [3/7] (25/2) | Double structure octahedral grains |
| Emulsion C | 2.0 | 0.55 | 25 | 7 | — | Uniform structure tabular grains |
| Emulsion D | 9.0 | 0.65 | 25 | 6 | [12/59/29] (0/11/8) | Triple structure tabular grains |
| Emulsion E | 9.0 | 0.85 | 23 | 5 | [8/59/33] (0/11/8) | Triple structure tabular grains |
| Emulsion F | 14.5 | 1.25 | 25 | 3 | [37/63] (34/3) | Double structure tabular grains |
| Emulsion G | 1.0 | 0.07 | 15 | 1 | — | Uniform structure fine grains |

In Table 2, (1) Emulsions A to F were subjected to a reduction sensitization using thiourea dioxide and thiosulfonic acid at preparation of grains, according to the Example described in JP-A No. 191938/1990.

(2) Emulsions A to F were subjected to a gold sensitization, a sulfur sensitization, and a selenium sensitization under the presence of respective sensitizing dyes described in each layer and sodium thiocyanate, according to Example described in JP-A No. 237450/1991.

(3) At the preparation of tabular grains, low-molecular-weight gelatin was used according to Example described in JP-A No. 158426/1989.

(4) Tabular grains and normal crystal grains having grain structure were observed a rearrangement line by a high-pressure electron microscope, as described in JP-A No. 237450/1991.

Further, compounds such as couplers and a variety of additives for use in this photosensitive material are shown below.

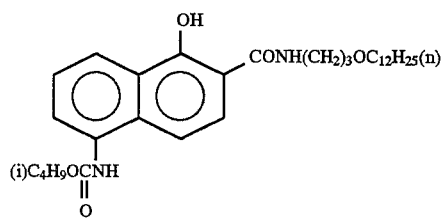
ExC-1
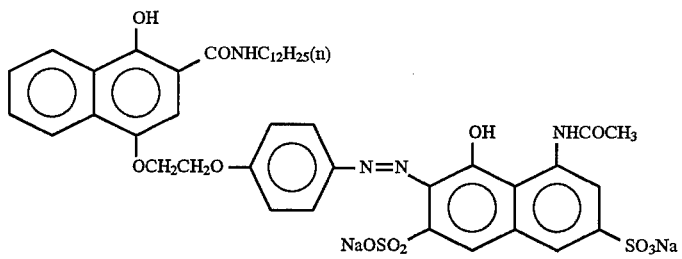
ExC-2
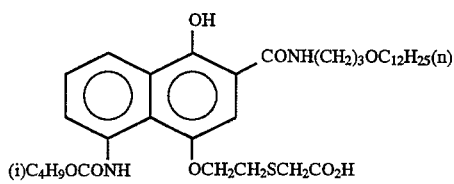
ExC-3
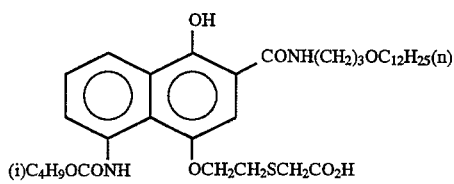
ExC-4
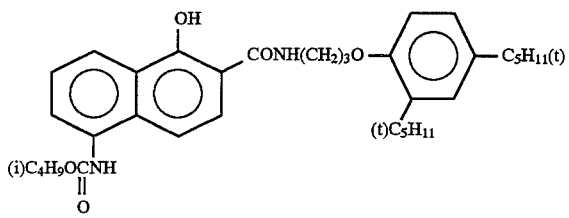
ExC-5
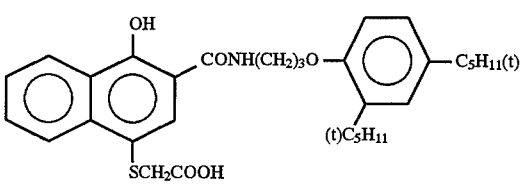
ExC-6

ExC-7
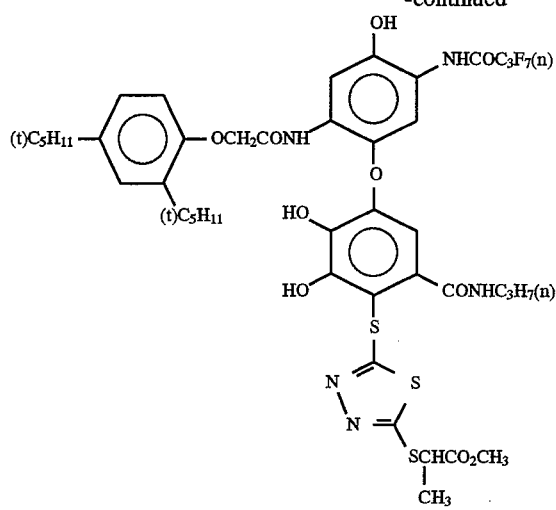
ExC-8
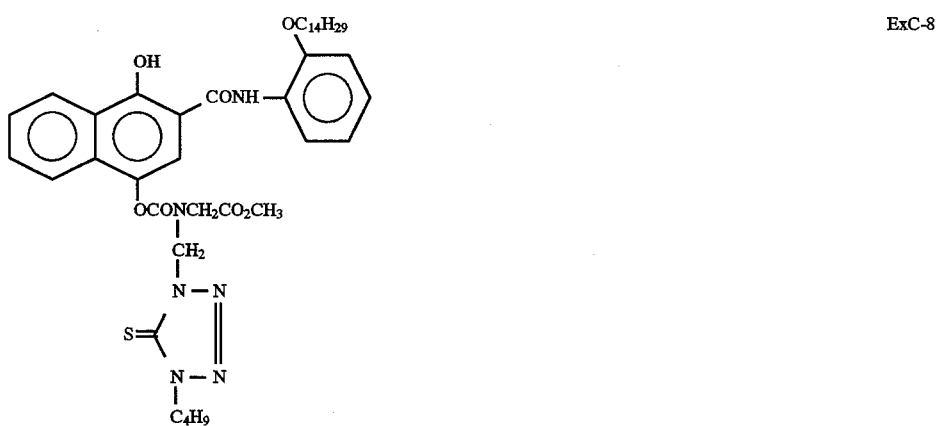
ExM-1
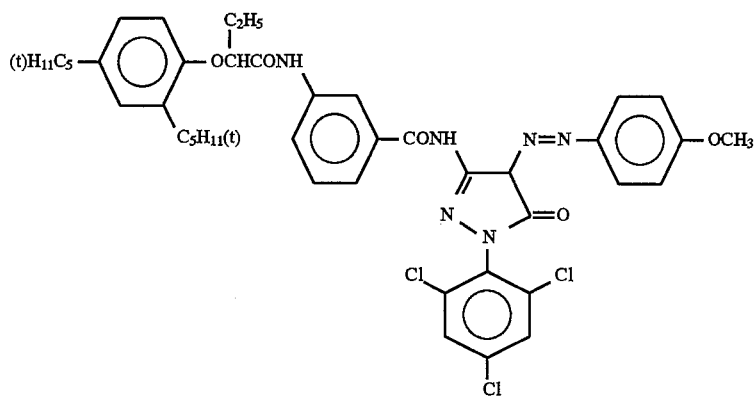
ExM-2
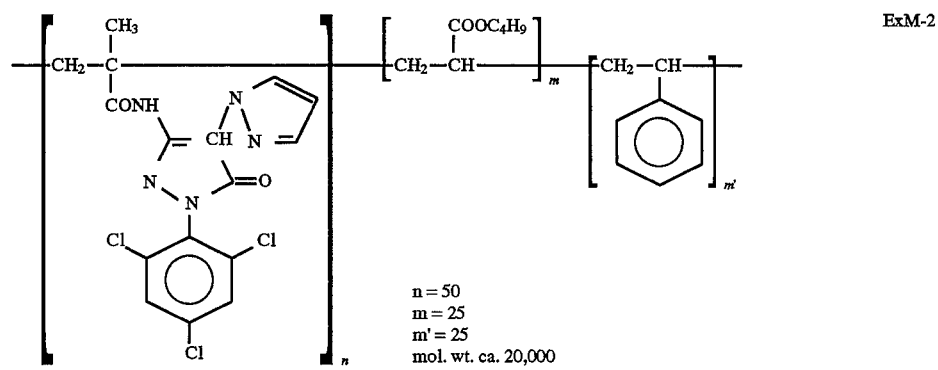
n = 50
m = 25
m' = 25
mol. wt. ca. 20,000

-continued
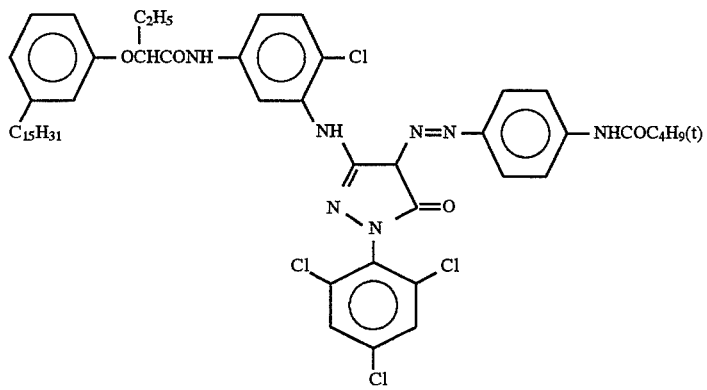
ExM-3
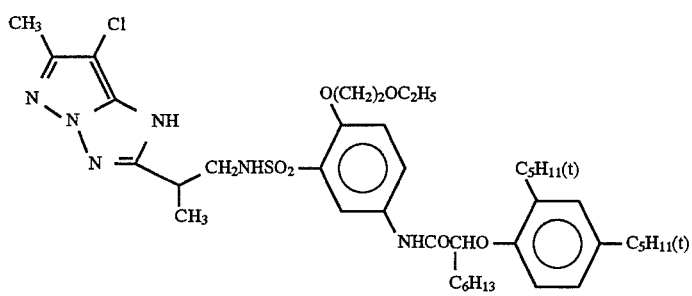
ExM-4
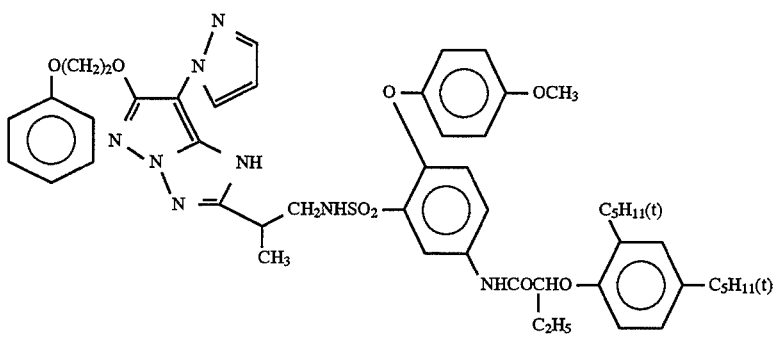
ExM-5
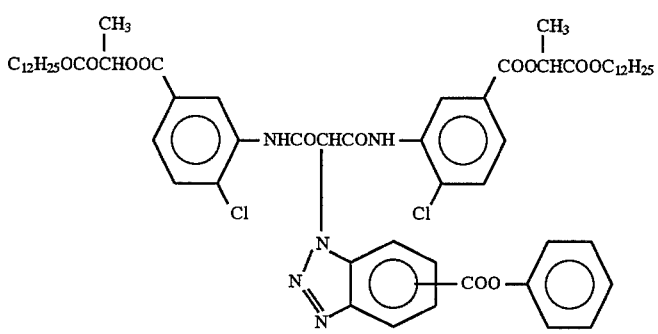
ExY-1
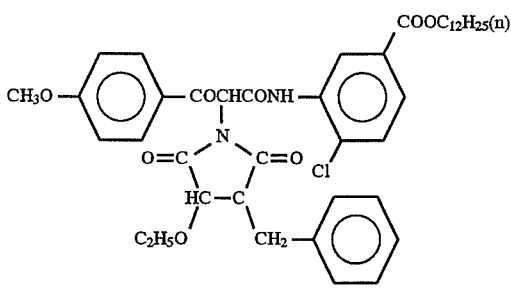
ExY-2

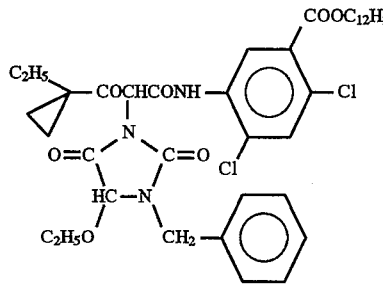
ExY-3
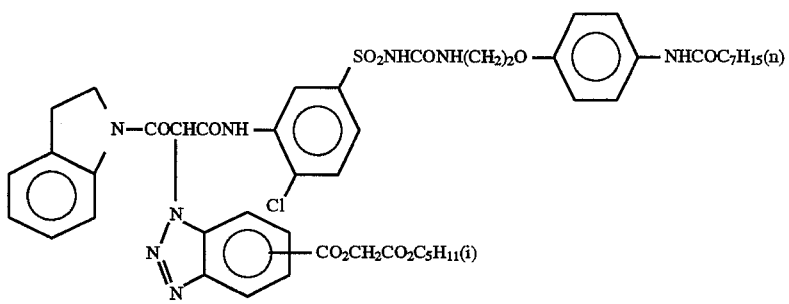
ExY-4
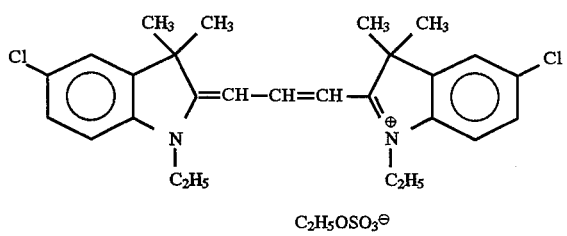
ExF-1
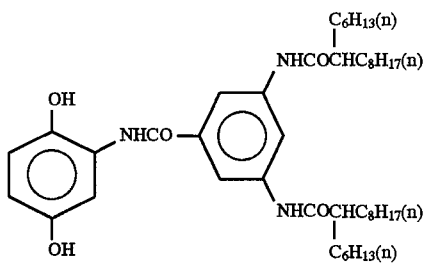
Cpd-1
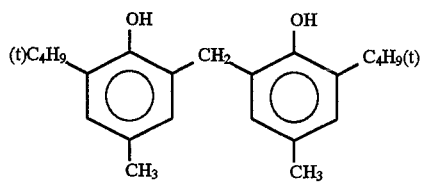
Cpd-2
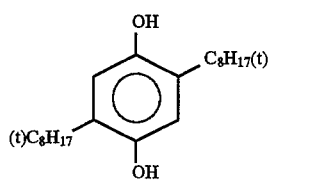
Cpd-3
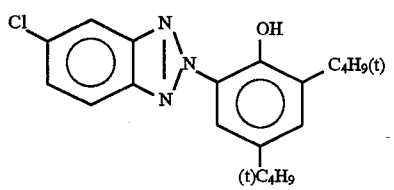
UV-1

-continued
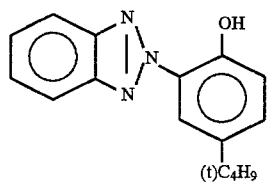   UV-2
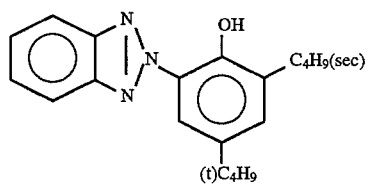   UV-3
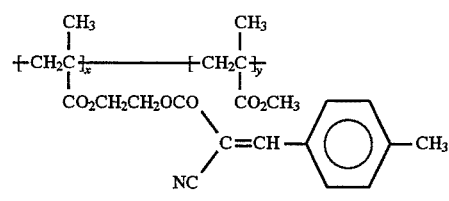   UV-4
x:y = 70:30 (wt %)
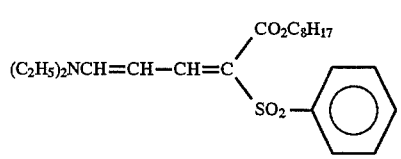   UV-5
Tricresyl phosphate   HBS-1
Di-n-butyl phthalate   HBS-2
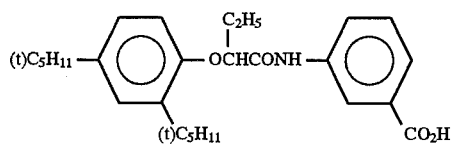   HBS-3
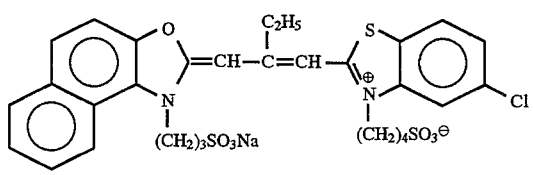   ExS-1
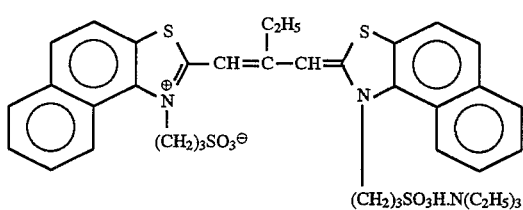   ExS-2
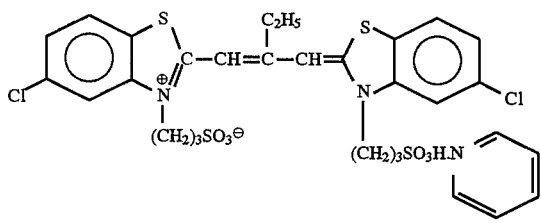   ExS-3

-continued
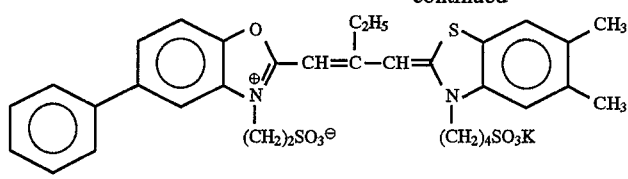 ExS-4
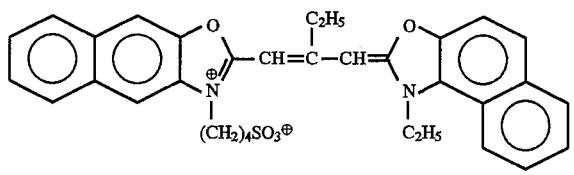 ExS-5
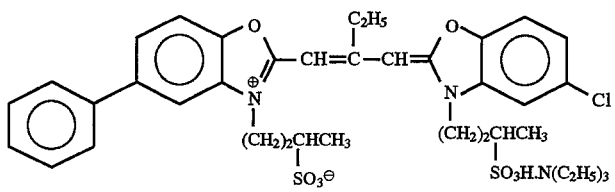 ExS-6
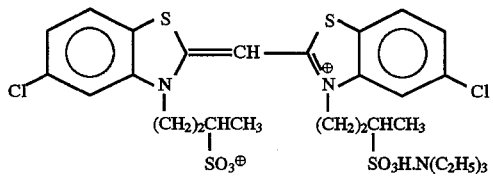 ExS-7
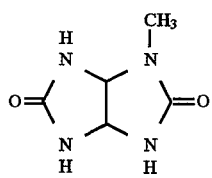 S-1
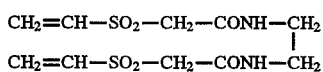 H-1
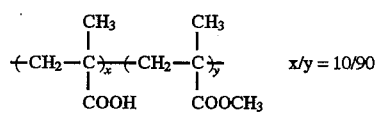 B-1
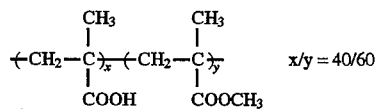 B-2
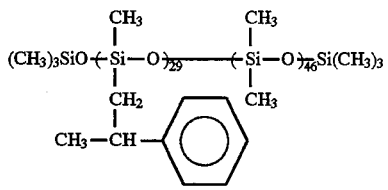 B-3
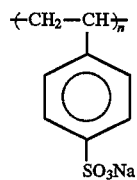 B-4

-continued
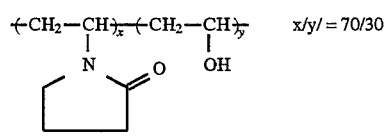 x/y/ = 70/30    B-5
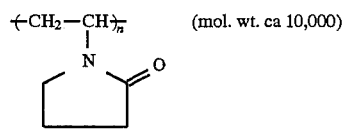 (mol. wt. ca 10,000)    B-6
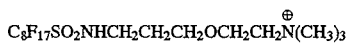    W-1
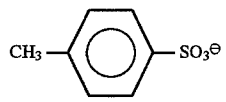
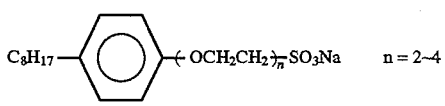 n = 2~4    W-2
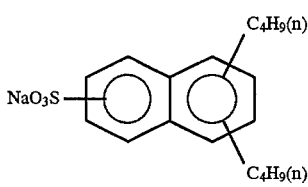    W-3
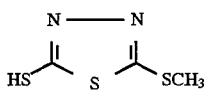    F-1
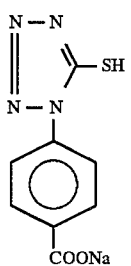    F-2
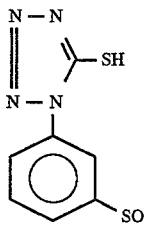    F-3
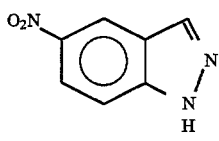    F-4
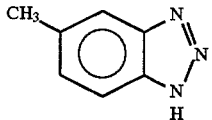    F-5
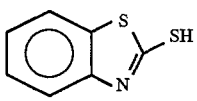    F-6

-continued

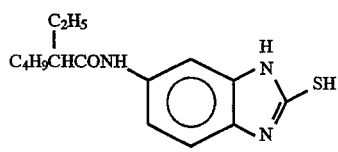
F-7

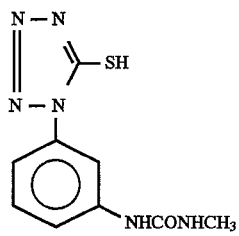
F-8

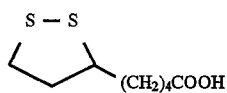
F-9

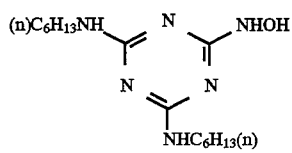
F-10

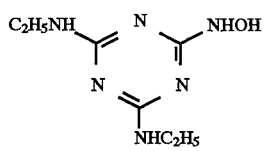
F-11

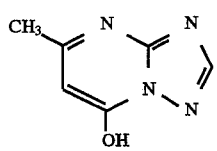
F-12

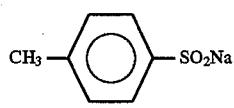
F-13

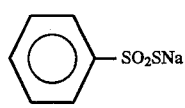
F-14

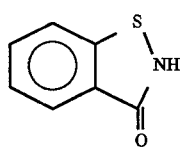
F-15

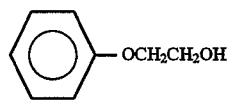
F-16

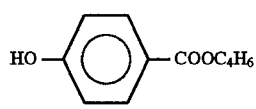
F-17

6) Evaluation of the Photographic Films

With samples of the thus prepared photographic films, evaluations of transverse curl (gutter-like curl) and core set curl were performed according to the steps described below.

(6-1) Curl at the Width Direction (transverse curl)

Films were each cut out in the size of 35 mm in width and 3 mm in length. After these pieces of films were subjected to a regulation of humidity at 25° C.10% RH for 4 hours or more, the degree of curl was measured by means of a curl board, according to the Test Method A of ANSI/AS C pH 1.29-1985. These results were shown by "○" or "x", according to measured values of 1/R[m$^{-1}$], wherein R represents the radius of the curl:

○: Measured value of 1/R[m$^{-1}$] is lower than 45 [m$^{-1}$]

x: Measured value of 1/R[m$^{-1}$] is 45 [m$^{-1}$], or higher than 45 [m$^{-1}$]

(6-2) Core Set Curl (1) Core Set

Sample films were slit in the size of 35 mm in width and 1.2 m in length. After these slit films were subjected to a regulation of humidity at 25° C.60% RH overnight, they were rolled on a spool of 7-mm diameter, so that the photosensitive layers of the films were placed on the inside. These rolls were kept in a sealed container at 80° C. for 2 hours, in order to make a core set curl. This temperature condition was set on the supposition that films are kept in a car in the summer season.

(2) Development Processing and Measurement of Core Set Curl

The films having a core set curl made under the above-described condition were left to cool in a room at 25° C. overnight. Then they were taken out from the sealed container and developed by an auto-processor (MINI-LAB FP-560B, manufactured by Fuji Photo Film Co., Ltd.). Immediately after that, the core set curl was measured under the condition of 25° C. and 60% RH using a curl board, in accordance with Test Method A of ANSI/ASC PH1.29–1985. These results were shown by 1/R [m$^{-1}$], wherein R represents the radius of the curl.

Further, development processing troubles, i.e., development processing unevenness and breakage of the tail end of the film, each of which is caused by a strong core set curl, were evaluated by visual inspection. The breakage of the tail end of the film is a breakage that is formed by crushing the curl at the tail end of the film with a roll, such as a driving roll, when the film has a strong curling that obstructs its unrolling.

Development unevenness was observed by visual inspection and the following evaluation was made.

○: No generation of unevenness was found

△: Generation of unevenness was slightly found x: Generation of unevenness was clearly found Further, breakage of the tail end of the film was observed, and the following evaluation was made.

○: No generation of the breakage was found

△: Generation of the breakage was found, but there was no problem at the printing x: Generation of the breakage was found, and problem arose at the printing The symbols "△" and "○" indicate a practically allowable level.

The development processing conditions are shown below. The samples for use in measurement were processed with a processing solution with which a previously image-wise-exposed sample had been subjected to a running processing until a color-developing solution had been replenished in an amount of three times as much as the volume of the replenisher tank.

Development Processing

| Processing step | Temperature | Time |
| --- | --- | --- |
| Color developing | 38° C. | 3 min |
| Stopping | 38° C. | 1 min |

-continued

Development Processing

| Processing step | Temperature | Time |
| --- | --- | --- |
| Water washing | 38° C. | 1 min |
| Bleaching | 38° C. | 2 min |
| Water washing | 38° C. | 1 min |
| Fixing | 38° C. | 2 min |
| Water washing | 38° C. | 1 min |
| Stabilizing | 38° C. | 1 min |

The composition of each processing solution is as followed, respectively:

| Color-Developer | |
| --- | --- |
| Sodium hydroxide | 2 g |
| Sodium sulfite | 2 g |
| Potassium bromide | 0.4 g |
| Sodium chloride | 1 g |
| Borax | 4 g |
| Hydroxylamine sulfate | 2 g |
| Ethylenediaminetetraacetic acid · 2Na · 2H$_2$O | 2 g |
| 4-Amino-3-methyl-N-ethyl-N-(β-hydroxyethy)-aniline monosulfonate | 4 g |
| Water to make | total 1 liter |
| Stop Bath | |
| Sodium thiosulfate | 10 g |
| Aqueous ammonium thiosulfate solution (70%) | 30 ml |
| Acetic acid | 30 ml |
| Sodium acetate | 5 g |
| Potash alum | 15 g |
| Water to make | total 1 liter |
| Bleaching Solution | |
| Iron (III) sodium ethylenediaminetetraacetate · dihydride | 100 g |
| Potasium bromide | 50 g |
| Ammonium nitrate | 50 g |
| Borax | 5 g |
| Aqueous ammonia | to make pH value 5.0 |
| Water to make | total 1 liter |
| Fixing Solution | |
| Sodium thiosulfate | 150 g |
| Sodium sulfite | 15 g |
| Borax | 12 g |
| Glacial acetic acid | 15 ml |
| Potash alum | 20 g |
| Water to make | total 1 liter |
| Stabilizing Solution | |
| Borax | 5 g |
| Sodium citrate | 5 g |
| Sodium methaborate · 4-hydride | 3 g |
| Potash alum | 15 g |
| Water to make | total 1 liter |

7) Results

The evaluation results were shown in Table 1. Sample Nos. 102–107, 109–112, 114–119, 121, 122, 124, and 125, as shown in Table 1, each having, as a support, the laminate polyester film of the present invention, were excellent in their minor transverse curl, as compared to samples having no laminate polyester film.

Further, Sample Nos. 102, 104, 106, 109, 111, 114, 116, 118, 121, and 124, each of which was subjected to heat treatment according to the heat-treatment method of the present invention, provided more preferable results, in that their core set curl was minor and no development processing troubles was caused. On the other hand, with samples that were not subjected to the heat treatment of the present invention, development problems were caused. Further, with Sample Nos. 106, 107, 118, and 119, wherein the Tg of at least one layer of the laminate polyester film was lower than 90° C., a somewhat strong core set curl was observed and development troubles were caused.

EXAMPLE 2

Preparation of the Support

Laminate polyester films, each having the layer composition of PEN/copolymer polyester or PEN/blend polyester shown in Table 3, were extruded under the same condition as Example 1, to make unstretching films. After that, these films were subjected to longitudinal stretching 3.0 times at 140° C., and then horizontal stretching 3.2 times at 130° C. Further, these films were subjected to heat-fixing for 20 seconds at the temperature shown in Table 3. The heat-fixing was carried out blowing hot air of a fixed temperature, while conducting 5% of relaxation. At this time, the difference between the highest temperature and the lowest temperature in the heat-fixing zone was 15° C. Then the films were cooled to 40° C. and rolled, to obtain biaxial stretching laminate films.

Further, the materials shown below were also used in this example, in addition to polymer materials as described in the body of this specification.

| | | |
|---|---|---|
| 4-1 2,6-NDCA/TPA/EG = 25/75/100 | Tg = 82° C. | Tm = 254° C. |
| 4-2 PEN/PET = 25/75 | Tg = 82° C. | Tm = 254° C. |
| 4-3 2,6-NDCA/NPG/EG = 100/80/20 | Tg = 95° C. | Tm = 235° C. |
| 4-4 PEN/PAr = 40/60 | Tg = 160° C. | Tm = 234° C. |
| 4-5 PET | Tg = 79° C. | Tm = 253° C. |

Moreover, the following PENs, each having a different intrinsic viscosity, were also used. 4-6 PEN (intrinsic viscosity 0.55) Tg=119° C. Tm=268° C. 4-7 PEN (intrinsic viscosity 0.72) Tg=119° C. Tm=268° C.

The Young's modulus and the adhesiveness between layers of the thus obtained laminate films were measured by the method described below.

Measurement of Young's Modulus

Sample films were slit in the size of 200 mm in length and 10 mm in width. After that, these slit films were applied to a tensile tester, so as to make the distance between chucks 100 mm. These were measured while pulling at the rate of 10 mm/minute under the condition of 25° C. and 60% RH in both the longitudinal and width directions, to obtain an average. These results were shown in Table 3.

Adhesiveness Between Layers

Cuts were made with a razor on one side of the film at 5-cm intervals. An adhesive tape was applied thereto and scrubbed. The adhesiveness was observed by rapidly stripping off the adhesive tape in the direction of 180°, and the following evaluation was made.

○: No peeling was found

Δ: 10% or less of peeling area was found x: More than 10% of peeling area was found The symbols "○" and "Δ" indicate an allowable level.

Sample Nos. 201, 211, 215, 223, 224, and 225, each containing 50 mol % or less of a common monomer component, or 50 wt % or less of a common polymer component, provided the level of the symbol "Δ", while all of the samples, each containing 50 mol % or more, or 50 wt % or more of the common component, other than the above identified samples, provided the level of the symbol "○".

TABLE 3

| Sample No. | Layer Construction Polyester A/B* | $\chi_{CA} - \chi_{CB} \over \chi_{CA}$ | Tg °C. | Tm °C. | Heat-fixing °C. | Young's modulu kg/mm² |
|---|---|---|---|---|---|---|
| 201 | 1-1(45)/2-1(45) | 1 | 119/91 | 268/254 | 240 | 520 |
| 202 | 1-1(45)/2-3(45) | 0.53 | 119/117 | 268/242 | 240 | 590 |
| 203 | " | 0.92 | " | " | 262 | 490 |
| 204 | " | 0.15 | " | " | 190 | 450 |
| 205 | 1-1( 8)/2-3(82) | " | " | " | " | " |
| 207 | 1-1(12)/2-3(78) | " | " | " | " | " |
| 208 | 1-1(33)/2-3(33) | " | " | " | " | " |
| 209 | 1-1(45)/2-3(45) | " | " | " | " | " |
| 210 | " | " | " | " | " | " |
| 211 | 1-1(45)/3-1(45) | 1 | 119/93 | 268/253 | 240 | 525 |
| 212 | 1-1(45)/2-6(45) | 0.56 | 119/121 | 268/260 | 240 | 585 |
| 213 | " | 0.90 | " | " | 262 | 485 |
| 214 | " | 0.20 | " | " | 205 | 455 |
| 215 | 1-1(45)/3-1(45) | 1 | 119/93 | 268/253 | 240 | 520 |
| 216 | 1-1(45)/3-3(45) | 0.72 | 119/116 | 268/265 | 240 | 590 |
| 217 | " | 0.93 | " | " | 262 | 480 |
| 218 | " | 0.18 | " | " | 210 | 445 |
| 219 | 1-1(45)/4-3(45) | 0.61 | 119/121 | 268/259 | 240 | 580 |
| 220 | " | 0.91 | " | " | 262 | 470 |
| 221 | " | 0.16 | " | " | 200 | 435 |
| 222 | 1-1(45)/4-3(45) | 1 | 119/95 | 268/235 | 240 | 500 |
| 223 | 1-1(45)/4-4(45) | 1 | 119/160 | 268/234 | 240 | 505 |
| 224 | 1-1(45)/4-1(45) | 0.15 | 119/82 | 268/254 | 240 | 540 |
| 225 | 1-1(45)/4-2(45) | 0.14 | 119/82 | 268/254 | 240 | 545 |
| 226 | 1-1(75)/4-5(15) | 0.67 | 119/79 | 268/253 | 235 | 520 |
| 227 | 4-6(45)/4-7(45) | 0.12 | 119/119 | 268/268 | 245 | 595 |

TABLE 3-continued

| Sample No. | Conditions of heat treatment | Diameter of spool mm | Pressure marks | Knick | Transverse curl 1/R (cm$^{-1}$) |
|---|---|---|---|---|---|
| 201 | Slow cooling for 10 hrs. from 130° C. to 80° C. | 7 | o | o | 30 |
| 202 | 110° C., 40 hrs. | 7 | o | o | 35 |
| 203 | " | 7 | o | o | 32 |
| 204 | " | 7 | o | o | 45 |
| 205 | " | 7 | o | o | 41 |
| 206 | " | 7 | o | o | 40 |
| 207 | " | 7 | o | Δ | 38 |
| 208 | " | 7 | o | o | 37 |
| 209 | " | 4 | x | o | 35 |
| 210 | " | 5 | Δ | o | 35 |
| 211 | " | 7 | o | o | 32 |
| 212 | " | 7 | o | o | 34 |
| 213 | " | 7 | o | o | 31 |
| 214 | " | 7 | o | o | 45 |
| 215 | Slow cooling for 15 hrs. from 130° C. to 55° C. | 7 | o | o | 30 |
| 216 | 110° C., 40 hrs. | 7 | o | o | 36 |
| 217 | " | 7 | o | o | 32 |
| 218 | " | 7 | o | o | 46 |
| 219 | " | 7 | o | o | 33 |
| 220 | " | 7 | o | o | 31 |
| 221 | " | 7 | o | o | 45 |
| 222 | " | 7 | o | o | 32 |
| 223 | " | 7 | o | o | 32 |
| 224 | " | 7 | o | o | 37 |
| 225 | " | 7 | o | o | 38 |
| 226 | " | 7 | o | o | 41 |
| 227 | " | 7 | o | o | 45 |

| Sample No. | Core set curl after development 1/R (m$^{-1}$) | Development processing trouble Unevenness | Breakage | Remarks |
|---|---|---|---|---|
| 201 | 44 | o | o | This invention |
| 202 | 42 | o | o | " |
| 203 | 43 | o | o | Comparative example |
| 204 | 49 | o | o | " |
| 205 | 50 | o | o | This invention |
| 206 | 43 | o | o | " |
| 207 | 43 | o | o | " |
| 208 | 48 | o | o | " |
| 209 | 50 | o | o | " |
| 210 | 42 | o | o | " |
| 211 | 45 | o | o | " |
| 212 | 49 | o | o | " |
| 213 | 50 | o | o | Comparative example |
| 214 | 42 | o | o | " |
| 215 | 41 | o | o | This invention |
| 216 | 45 | o | o | " |
| 217 | 48 | o | o | Comparative example |
| 218 | 49 | o | o | " |
| 219 | 42 | o | o | This invention |
| 220 | 44 | o | o | Comparative example |
| 221 | 49 | o | o | " |
| 222 | 48 | o | o | This invention |
| 223 | 43 | o | o | " |
| 224 | 85 | Δ | x | Comparative example |
| 225 | 88 | Δ | x | " |
| 226 | 95 | Δ | x | " |
| 227 | 42 | o | o | This invention |

Note:
*Figures in parenthesis mean thickness in terms of μm.

2) Heat Treatment and Surface Treatment of the Support and Coating of the Undercoating Layer, the Antistatic Layer, the Back Layer, and the Lubricant Layer Both sides of the film thus obtained by the above-described method were subjected to a glow discharge treatment in the same manner as in Example 1. After that, an antistatic layer was applied to one side of the film in the same manner as in Example 1, and then the film was subjected to heat treatment under the condition shown in Table 3. The heat treatment was carried out so that the antistatic layer would be rolled inwards on an aluminum spool of 30-cm diameter. After that, a undercoating layer was coated on the opposite side of the antistatic layer, in the same manner as in Example 1. Further, a back layer and a lubricant layer were coated on the same side of the antistatic layer, in the same manner as in Example 1.

3) Coating of the Photosensitive Layers

Photosensitive layers were coated on the same side of the undercoating layer, in the same manner as in Example 1.

4) Evaluation of the Photosensitive material

With the thus obtained photosensitive material, transverse curl, curl after development, development processing trouble, pressure marks, and knicks were evaluated.

(4-1) Transverse Curl (curl in the width direction)

The curl was evaluated in the same manner as in Example 1.

(4-2) Curl After Development and Development Processing Trouble

The core set curl was measured after the photosensitive material was core-set and developed in the same manner as in Example 1. Development processing troubles were observed and evaluated in the same manner as in Example 1.

(4-3) Pressure Marks

An unexposed photosensitive material, which had been subjected to a regulation of humidity at 25° C.60% RH, was rolled on the spool as shown in Table 3, so as to place the photosensitive layers of the material on the inside, and then it was left for 1 hour. After the photosensitive material was subjected to development processing in the same manner applied for the evaluation of the core set curl in Example 1, pressure marks were observed by visual inspection, and the following evaluation was made.

○: No generation of pressure marks was found

Δ: Pressure marks were found in the region within 10 cm from the tail end of the film x: Pressure marks were found in a winder region The symbols "Δ" and "○" indicate an allowable level.

(4-4) Knicks

After the unexposed photosensitive material was subjected to development processing in the same manner applied for the evaluation of the core set curl in Example 1, knicks generated in the photosensitive material were observed, and the following evaluation was made.

○: No generation of knicks was found

Δ: Generation of knicks was found, but it had no bad influence on the printing x: Generation of knicks was found, and it had a bad influence on the printing The symbols "Δ" and "○" indicate an allowable level.

5) Results

The results of evaluation were shown in Table 3. Sample Nos. 203, 204, 213, 214, 217, 218, 220 and 221, each of which was subjected to heat-fixing at a temperature out of the range specified in the present invention, did not provide good results, since Young's modulus greatly decreased or a big curl in the width direction was provided. On the other hand, other samples, each of which was subjected to heat-fixing under the condition according to the present invention, were excellent, in that Young's modulus was high and the curl in the width direction was minor. Further, Sample No. 227, wherein layers composed of the same material, but having different intrinsic viscosities were laminated, was not preferable, because of its great curl in the width direction.

It is more preferable that the Tg of each layer is 90° C. or more. With Sample Nos. 224, 225, and 226, each of which was composed of materials having a Tg of less than 90° C., it was found that the core set curl was somewhat large and development processing troubles were caused.

It is more preferable that ($\chi$CA–$\chi$CB)/$\chi$CA is from 0.05 to 0.9. With Sample Nos. 201, 211, 215, 222, and 223, each of which did not reach the above-described range, Young's modulus was somewhat decreased.

The thickness of each layer is preferably 10 μm or more. With Sample No. 205, having a thickness of less than 10 μm, the value of the transverse curl was somewhat large. Further, a weak knick of the Δ level was caused in Sample No. 207, having less than 60 μm in total thickness of all layers. Other samples having not less than 60 μm in total thickness each provided the "○" level.

It is preferable that the difference in Tm between materials of each layer is from 30° C. to 2° C. The Young's modulus of Sample Nos. 222 and 223, each of which did not reach the above-described range, was somewhat decreased. On the other hand, with Sample No. 227, wherein the Tm of materials for each layer was the same, and therefore the difference thereof was zero, transverse curl was somewhat larger than those of samples having a difference of 2° C. or more in terms of the Tm in Example 2.

The diameter of the spool is more preferably not less than 5 mm. In Sample No. 209, which was rolled on a spool whose diameter was less than 5 mm, there was found generation of pressure marks.

According to the production method of the present invention, a photographic polyester laminate film that hardly provides transverse curl (a curl in the width direction) and that is excellent in mechanical strength and adhesiveness between layers, can be produced.

Having described our invention as related to the present embodiments, it is our intention that the invention not be limited by any of the details of the description, unless otherwise specified, but rather be construed broadly within its spirit and scope as set out in the accompanying claims.

What we claim is:

1. A method of producing a photographic polyester laminate support comprising a laminate of layers of at least two kinds of polyesters each having a glass transition temperature (Tg) within the range of from 90° C. to 180° C., which comprises subjecting the laminate of layers of polyesters to heat-fixing in a temperature range defined by formula (1):

$$\text{Heat-fixing temperature (°C.)} = (Tm(L) - 50) \text{ to } (Tm(H) - 10) \qquad \text{formula (1)}$$

wherein Tm(H) (°C.) means the highest melting temperature of polyesters that constitute the laminate support, and Tm(L) (°C.) means the lowest melting temperature of polyesters that constitute the laminate support, and wherein each of the polyesters contains no hydrophilic group, and wherein the temperature of heat-fixing is higher than the Tg.

2. The method of producing a photographic polyester laminate support as claimed in claim 1, wherein the difference between Tm(H) and Tm(L) is within the range of from 2° C. to 30° C.

3. The method of producing a photographic polyester laminate support as claimed in claim 1, wherein the laminate support is composed of a laminate of 5 to 2 layers of polyester.

4. The method of producing a photographic polyester laminate support as claimed in claim 1, wherein, after the heat-fixing, the photographic polyester laminate support is treated with heat at a temperature of from 50° C. to the highest Tg of the polyester.

5. The method of producing a photographic polyester laminate support as claimed in claim 1, wherein the polyester is polyethylene-2,6-naphthalate.

6. The method of producing a photographic polyester laminate support as claimed in claim 1, comprising at least one layer of a copolyerized polyester or a blend of polyesters.

7. A photographic polyester laminate support that is produced by a method of producing a photographic polyester laminate support comprising a laminate of layers of at least two kinds of polyesters each having a glass transition temperature (Tg) within the range of from 90° C. to 180° C., which comprises subjecting the laminate of layers of polyesters to heat-fixing in a temperature range defined by formula (1):

$$\text{Heat-fixing temperature (°C.)} = (Tm(L) - 50) \text{ to } (Tm(H) - 10) \quad \text{formula (1)}$$

wherein Tm(H) (°C.) means the highest melting temperature of polyesters that constitute the laminate support, and Tm(L)(°C.) means the lowest melting temperature of polyesters that constitute the laminate support, and wherein each of the polyesters contains no hydrophilic group, and wherein the temperature of heat-fixing is higher than the Tg, in which support the crystallinity χCA of the outermost layer and the crystallinity XCB of the other outermost layer satisfy the relation of formula (4):

$$0.05 \leq (\chi CA - \chi CB)/\chi CA \leq 0.9. \quad \text{formula (4)}.$$

8. The photographic polyester laminate support as claimed in claim 7, comprising one layer of a polyester formed from a naphthalene dicarboxylic acid and an ethylene glycol as main components.

9. The photographic polyester laminate support as claimed in claim 7, comprising adjacent layers of polyester that are formed from monomers common to each other in not less than 50 mol %.

10. The photographic polyester laminate support as claimed in claim 7, comprising adjacent layers of polyester that are composed of polymers having polymer components common to each other in not less than 50 wt %.

11. The photographic polyester laminate support as claimed in claim 7, wherein the laminate consists of two layers and the total thickness of all layers is within the range of from 60 μm to 100 μm.

12. The photographic polyester laminate support as claimed in claim 8, wherein the polyester is polyethylene-2,6-naphthalate.

13. The photographic polyester laminate support as claimed in claim 7, comprising at least one layer of a copolymerized polyester or a blend of polyesters.

14. The photographic polyester laminate support as claimed in claim 7, wherein, after the heat-fixing, the photographic polyester laminate support is treated with heat at a temperature of from 50° C. to the highest Tg of the polyester.

15. A silver halide photosensitive material, comprising at least one light-sensitive layer coated on a photographic polyester laminate support that is produced by a method of producing a photographic polyester laminate support comprising a laminate of layers of at least two kinds of polyesters each having a glass transition temperature (Tg) within the range of from 90° C. to 180° C. which comprises subjecting the laminate of layers of polyesters to heat-fixing in a temperature range defined by formula (1):

$$\text{Heat-fixing temperature (°C.)} = (Tm(L) - 50) \text{ to } (Tm(H) - 10) \quad \text{formula (1)}$$

wherein Tm(H) (°C.) means the highest melting temperature of polyesters that constitute the laminate support, and Tm(L)(° C.) means the lowest melting temperature of polyesters that constitute the laminate support, and wherein each of the polyesters contains no hydrophilic group, and wherein the temperature of heat-fixing is higher than the Tq, in which support the crystallinity χCA of the outermost layer and the crystallinity χCB of the other outermost layer satisfy the relation of formula (4):

$$0.05 \leq (\chi CA - \chi CB)/\chi CA \leq 0.9. \quad \text{formula (4)}.$$

16. The silver halide photosensitive material as claimed in claim 15, wherein the photographic polyester laminate support is treated with heat at a temperature of from the highest Tg of the polyester among those of polyesters that constitute the polyester laminate, to 50° C., at a stage after film-forming step of the laminate and before coating of light-sensitive layers.

17. The silver halide photosensitive material as claimed in claim 15, wherein the photosensitive material is in a roll form spooled in a spool having a outer diameter of from 5 to 11 mm.

* * * * *